(12) United States Patent  
Fang et al.

(10) Patent No.: US 9,136,516 B2  
(45) Date of Patent: Sep. 15, 2015

(54) HYBRID MATERIALS USING IONIC PARTICLES

(75) Inventors: Jason Fang, Taipei (TW); Li-Duan Tsai, Hsinchu (TW); Yueh-Wei Lin, Hsinchu (TW); Cheng-Liang Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 601 days.

(21) Appl. No.: 12/981,411

(22) Filed: Dec. 29, 2010

(65) Prior Publication Data

US 2012/0171573 A1 Jul. 5, 2012

(51) Int. Cl.
| | |
|---|---|
| *H01M 2/16* | (2006.01) |
| *B82Y 30/00* | (2011.01) |
| *H01M 10/052* | (2010.01) |

(52) U.S. Cl.
CPC .......... *H01M 2/1653* (2013.01); *H01M 2/1646* (2013.01); *H01M 2/1686* (2013.01); *B82Y 30/00* (2013.01); *H01M 10/052* (2013.01); *Y10T 428/24999* (2015.04); *Y10T 428/249954* (2015.04)

(58) Field of Classification Search
USPC .............................. 428/317.1, 315.7; 977/773
See application file for complete search history.

(56) References Cited

U.S. PATENT DOCUMENTS 3,485,658 A * 12/1969 Iler ................................ 428/328
7,141,518 B2 * 11/2006 MacDonald et al. ............ 442/59
7,754,375 B2    7/2010 Fujikawa et al.
2003/0049538 A1    3/2003 Buerger et al.
2005/0084761 A1    4/2005 Hennige et al.
2005/0271947 A1   12/2005 Nilsson
2006/0188907 A1 *  8/2006 Lee et al. ........................... 435/6
2007/0054577 A1    3/2007 Avloni
2007/0077478 A1    4/2007 Nguyen et al.
2007/0122675 A1    5/2007 Angell et al.
2008/0190841 A1    8/2008 Pascaly et al.
2008/0268226 A1 * 10/2008 Demirel et al. ............ 428/315.5
2009/0220840 A1    9/2009 Yamaguchi et al.
2009/0246613 A1   10/2009 Park et al.
2009/0277838 A1 * 11/2009 Liu et al. ........................ 210/656

(Continued)

FOREIGN PATENT DOCUMENTS

| EP | 1 770 817 A2 | 4/2007 |
| WO | WO 99/16138 | 4/1999 |
| WO | WO 2010/116729 A1 | 10/2010 |

OTHER PUBLICATIONS

"Superhydrophilic and solvent resistant coatings on polypropylene fabrics by a simple deposition process"; J. Mater. Chem., 2010, 20, 1651-1653/1651.

(Continued)

*Primary Examiner* — Hai Vo
(74) *Attorney, Agent, or Firm* — Finnegan, Henderson, Farabow, Garrett & Dunner LLP

(57) ABSTRACT

A separator substrate include a substrate having a bulk portion and a surface portion, the surface portion having at least one porous area with a net charge; and ionic particles coupling to at least a part of the at least one porous area. The ionic particles have a net charge of an opposite sign to the net charge of the at least one porous area. The coupling between the part of the at least one porous area and the ionic particles may result in at least one of a good electrochemical performance, chemical stability, thermal stability, wettability, and mechanical strength of the separator substrate.

11 Claims, 29 Drawing Sheets

(56) References Cited

U.S. PATENT DOCUMENTS

2010/0006005 A1    1/2010  Roesch et al.
2011/0064936 A1*   3/2011  Hammond-Cunningham
                           et al. .......................... 428/306.6

OTHER PUBLICATIONS

Zhang; "A review on the separators of liquid electrolyte Li-ion batteries"; Journal of Power Sources 164 (2007) 351-364.

* cited by examiner

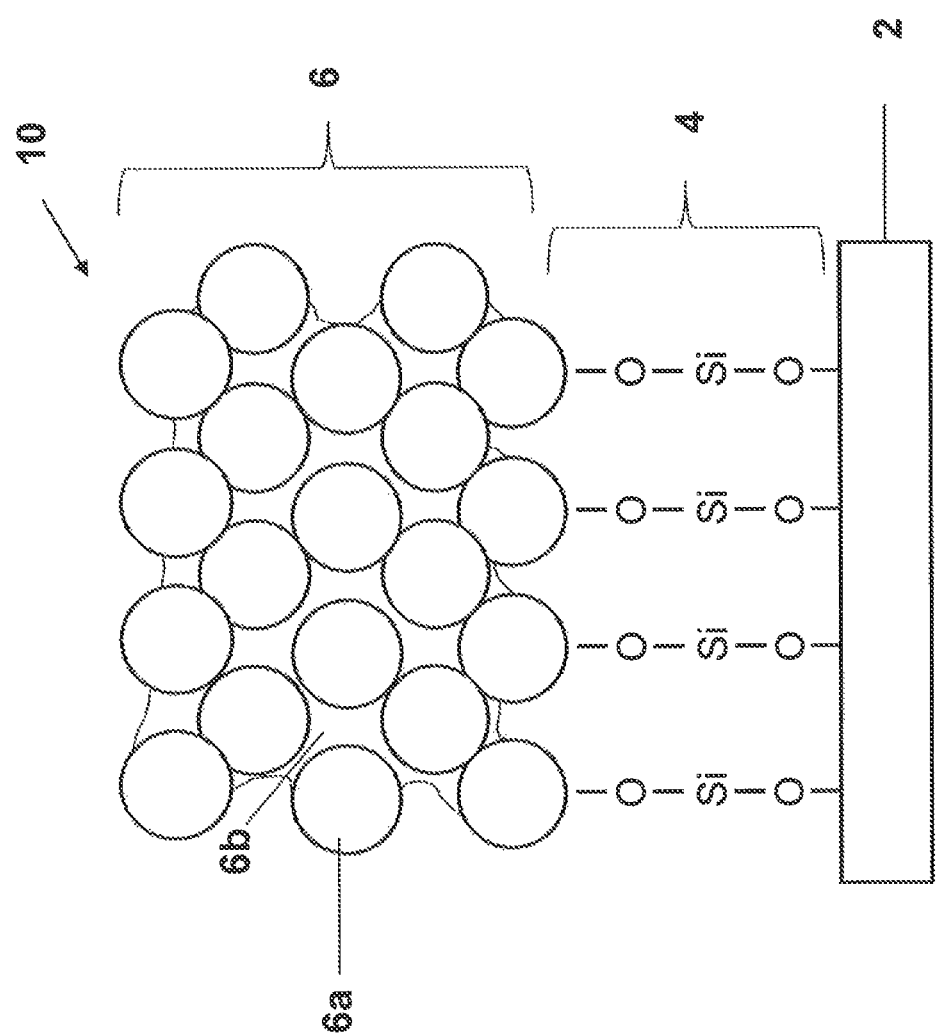

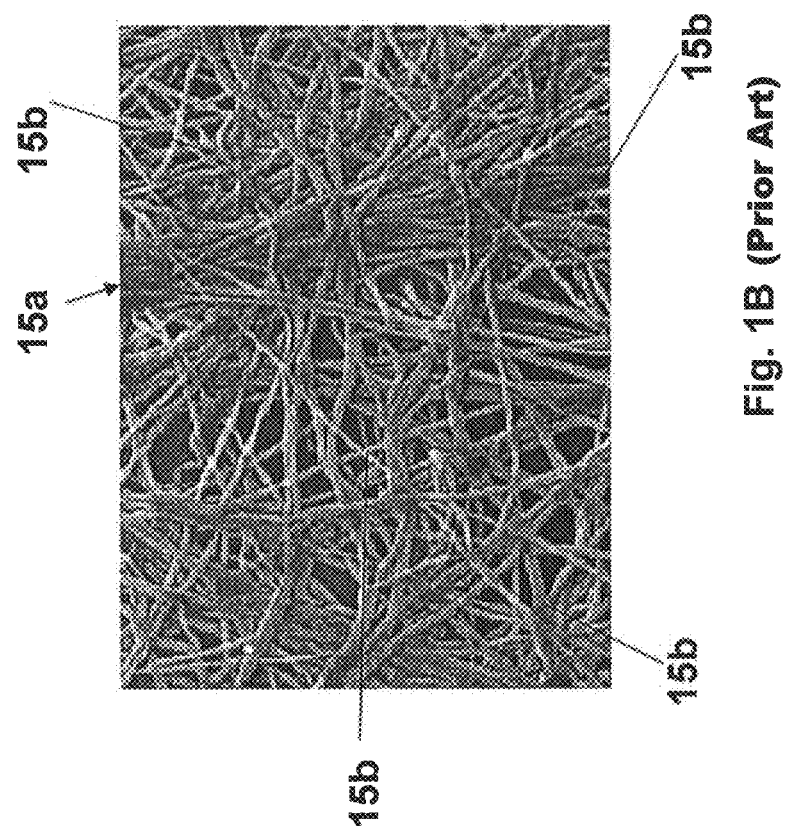

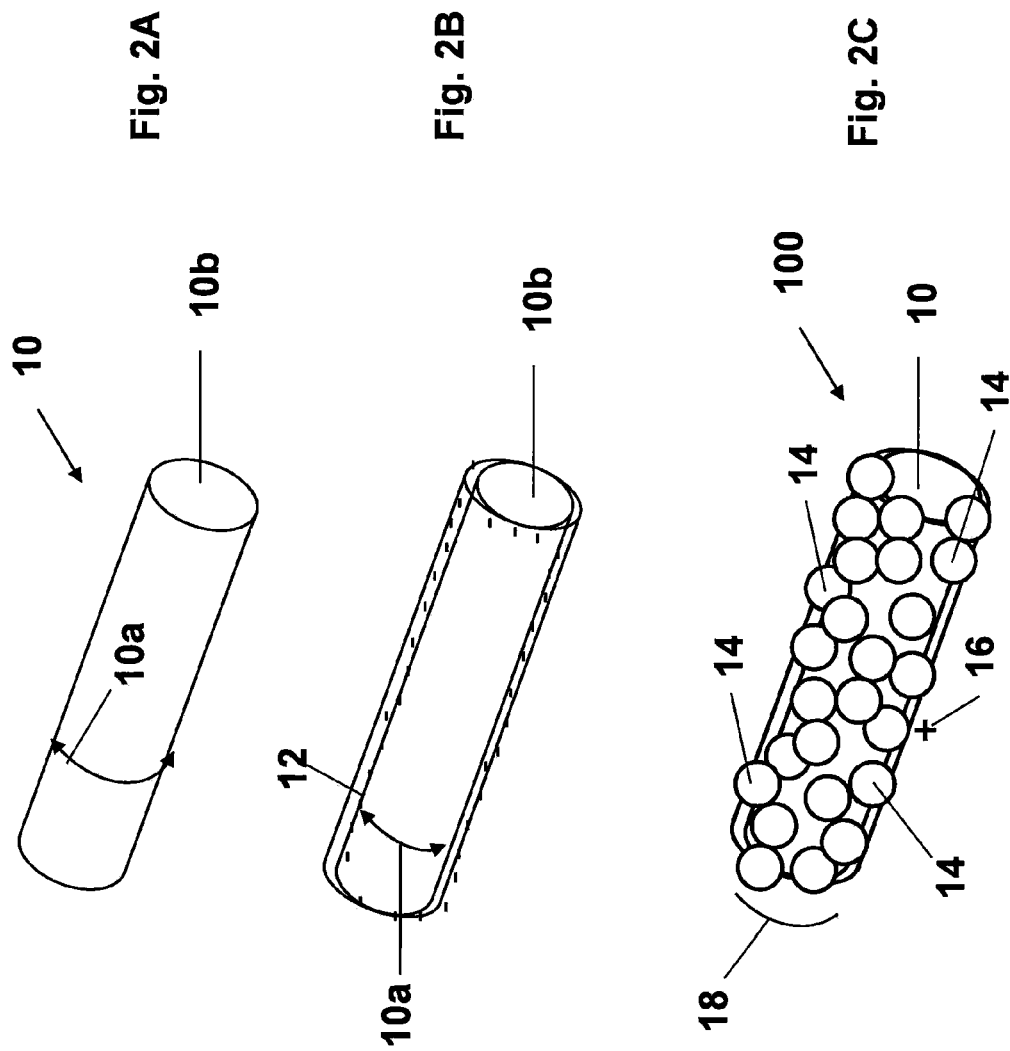

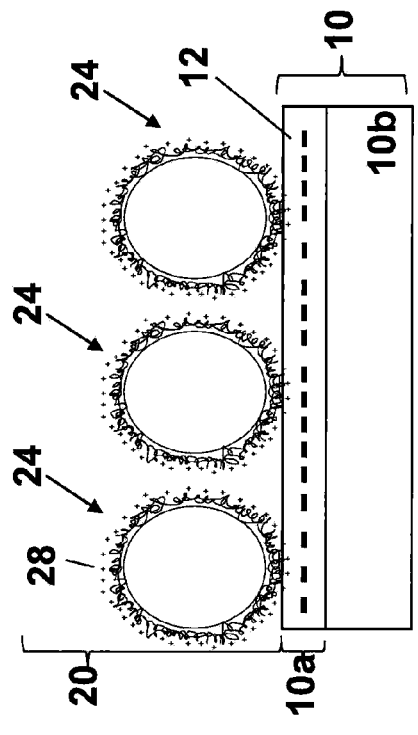
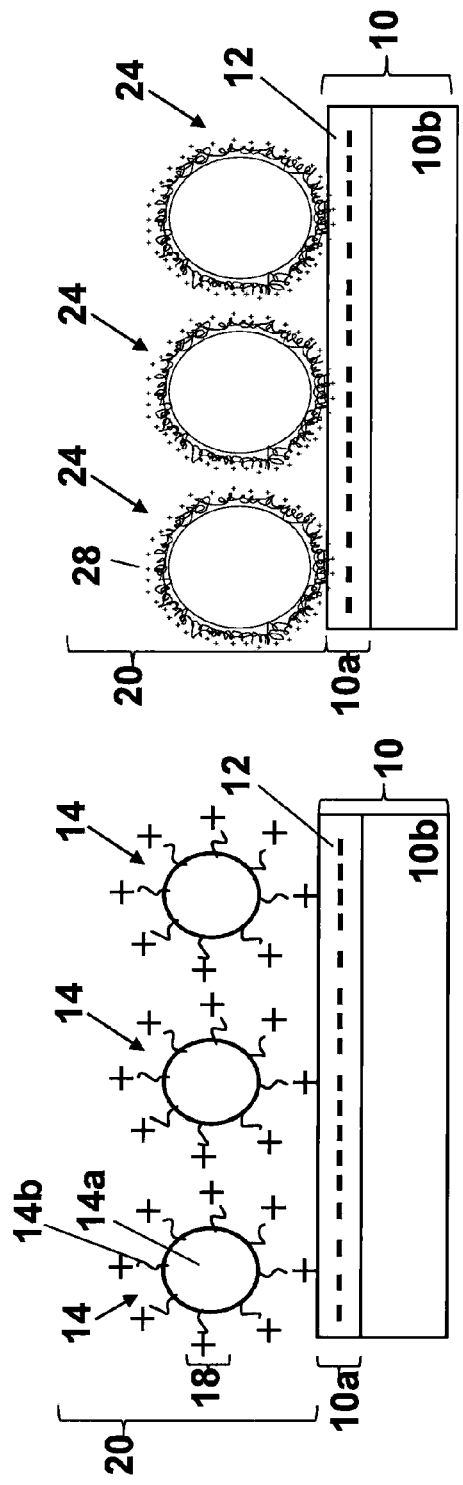
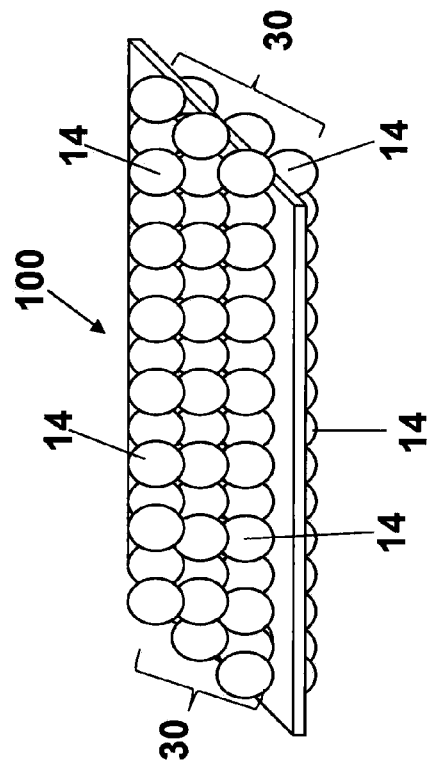
Fig. 3C-2
Fig. 3C-1
Fig. 3D

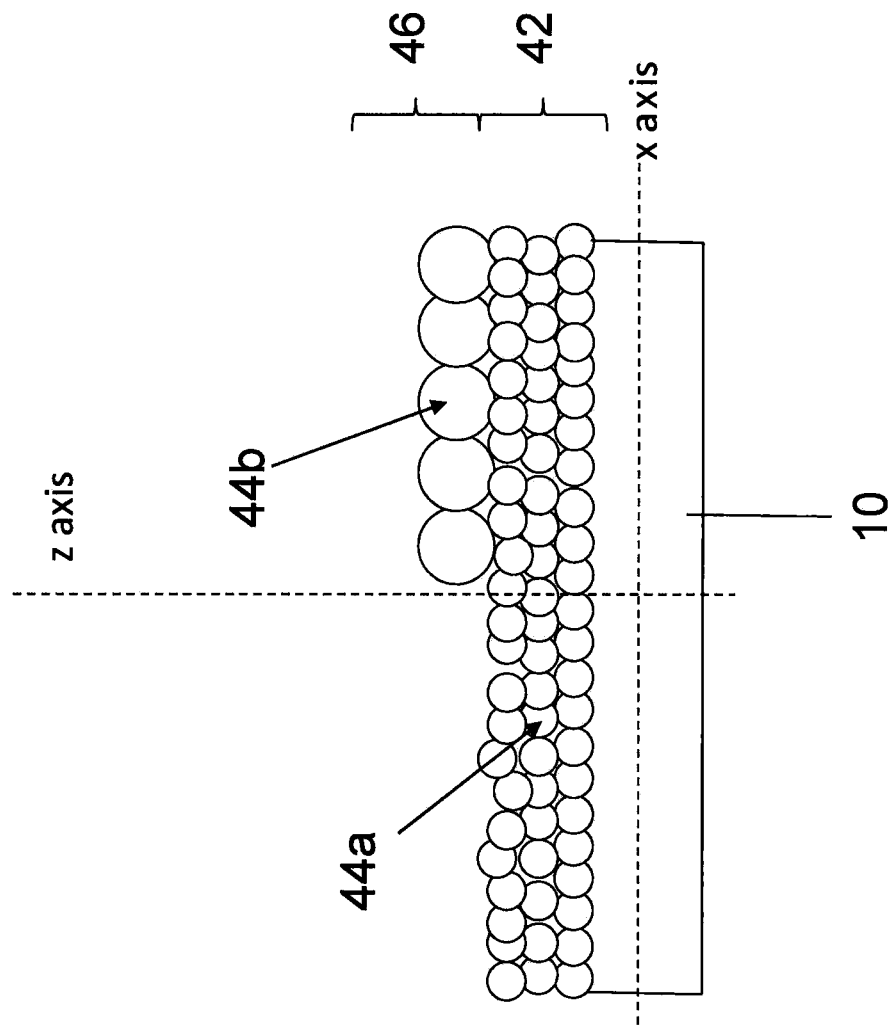

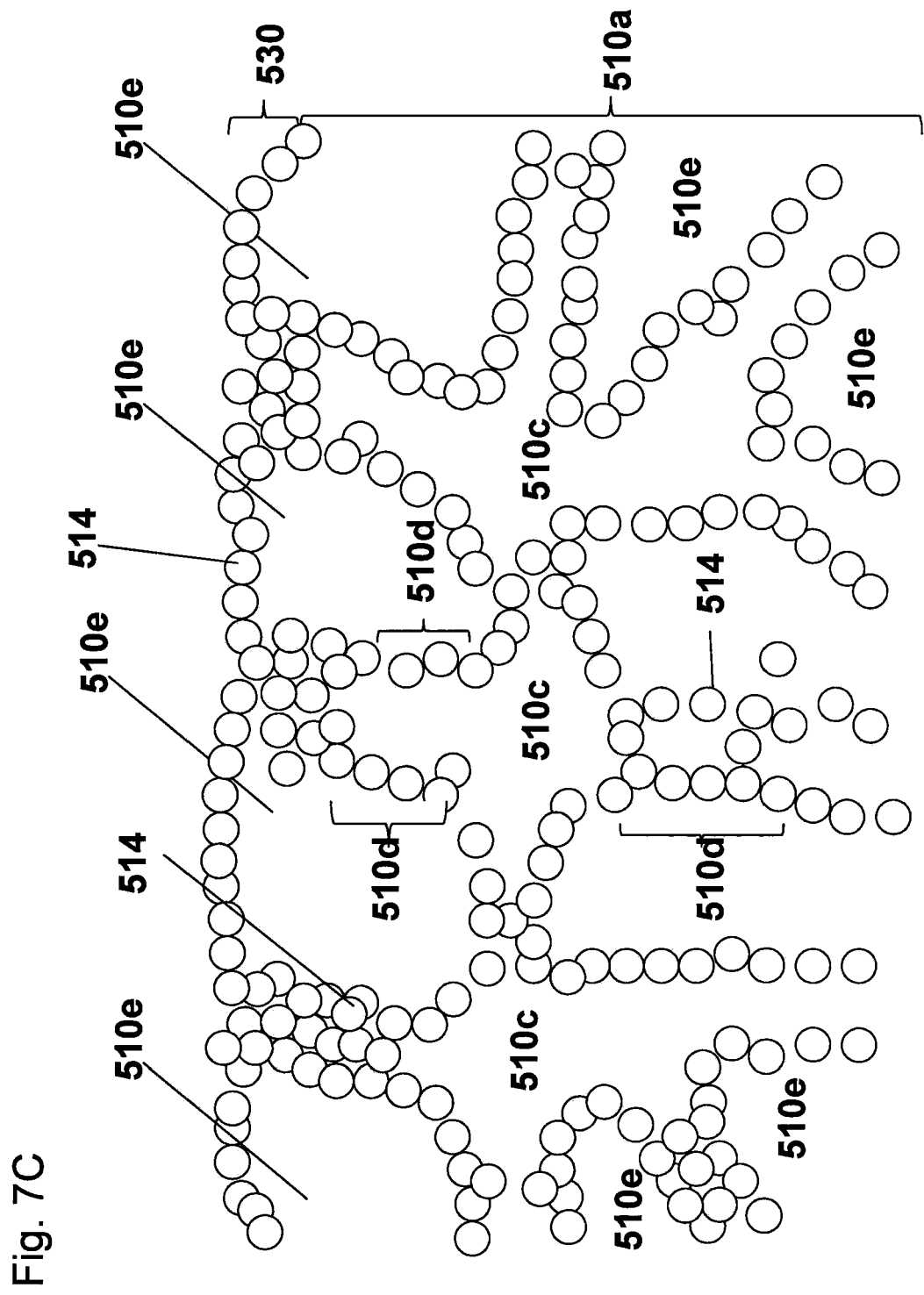

HYBRID MATERIALS USING IONIC PARTICLES

TECHNICAL FIELD

The present disclosure relates to hybrid materials and methods of making and using hybrid materials. In particular, the disclosure relates to hybrid materials having a polymer and ionic nanoparticles and the various applications of hybrid materials, such as in batteries and electrochemical cells.

BACKGROUND

Many applications have materials requirements that may be expensive, difficult, or impossible to meet in a single, monolithic material. For example, certain applications call for the chemical and/or thermal stability of ceramic materials, yet also require mechanical flexibility and amenability to certain types of processing (e.g., extrusion, spin-coating, etc.) found in some polymeric materials. In such instances, composite and/or hybrid materials that combine two or more different types of materials may be used. Examples span a variety of different fields and applications, including electrochemical batteries, aerospace engineering and armor.

Without limiting the scope of the application, one example of a hybrid material application is hybrid material used in battery separators or separators in electrochemical cells. A battery or electrochemical cell separator must separate electrodes from one another but may maintain a sufficient degree of ionic conductivity. The separator may be a thin, porous insulating material with good mechanical strength. Polymeric separators are often used for their high mechanical strength and amenability to processing techniques, such as those processing techniques that introduce a high degree of porosity. Examples of commonly used polymers in battery separators include organic polyolefin and composite materials, e.g., polypropylene, polyethylene, polypropylene, etc. Certain conventional polymeric materials, however, may lack thermal stability, chemical stability, or both. This may make them less than ideal for certain applications, such as exposure to chemically corrosive environment or high temperatures, one or both of which may occur in high-performance batteries. For this reason, high performance batteries tend to use inorganic separators (e.g., glass and ceramic separators) that are more compatible with their corrosive, non-polymeric electrolytes. Certain inorganic separators may have disadvantages, such as brittleness or challenges in machining process.

FIG. 1A illustrates a ceramic/polymer composite material 10 that may be used as a battery separator in the Prior Art. As illustrated in FIG. 1A, a substrate 2, typically polymeric, may be functionalized with an oxide group 4. The substrate 2 may be porous, which may increase the surface area for ion exchange. Surface functionalization 4 allows the coating of the substrate 2 with a layer of material 6 to improve properties such as thermal and chemical stability and wettability. Wettability by various electrolytes used in battery applications is of particular concern because separators with low electrolyte wettability can degrade or decrease the efficiency of the battery. In many examples, the material 6 may include particles 6a of a ceramic, glass and/or metal oxide composition. Such particles 6a may be deposited on the substrate 2 in a number of ways, such as by sol-gel processing or by wet deposition. Generally, in order to keep the material 6 intact, it is necessary to employ some kind of a binder 6C to bind the particles 6a to one another. To get the material 6 to fix or stay on the surface, it may also be necessary to heat the material at temperatures high enough to sinter the ceramic particles 6a. Sintering may cause chemical bonding in some of the particles 6a with other particles 6a or with binder 6C. For example, sintering may activate the chemical cross-links from particle 6a-binder 6C-particle 6a and/or particle 6a-binder 6C-substrate 2. In some cases, sintering may even cause particles 6a to fuse together partially or completely. However, the high heat of the sintering process may degrade the substrate 2. Moreover, the use of a binder 6C has significant disadvantages, including placing inherent limitations on the density of particles 6a in the material as well as introducing chemical agents into the composite material 10 that may be leech or degrade in the harsh chemical environment of an electrochemical cell.

FIG. 1B is an electron micrograph of an exemplary substrate. FIG. 1B is re-printed from S. S. Zhang, "A review on the separators of liquid electrolyte Li-ion batteries," *Journal of Power Sources*, Volume 164, Issue 1, 2007, page 351. FIG. 1B shows a nonwoven fabric substrate 15a. Specifically, FIG. 1B illustrates a top view image of a nonwoven fabric substrate 15a prior to the addition of particles 6a. FIG. 1B illustrates the nonwoven fabric substrate 15a having several fibers 15b.

FIG. 1C shows an electron micrograph top view of a ceramic/nonwoven separator 600 made by depositing a micro particle, metal oxide and binder coating 630 on a surface of a commercial substrate. FIG. 1C is re-printed from S. S. Zhang, "A review on the separators of liquid electrolyte Li-ion batteries," *Journal of Power Sources*, Volume 164, Issue 1, 2007, page 351. FIG. 1C shows, for example, several of the metal oxide particles 614. A binder 616 (not visible in FIG. 1C) is also present between the oxide particles 614. FIG. 1C shows, for example, several of the metal oxide particles 614 as well as a binder 616 between the particles 614.

In each of these examples, the protective ceramic layer is relatively thick (e.g., on order of several microns). Moreover, in some applications or processes, the protective layer is applied using a binder and/or high temperature sintering that may degrade or limit the properties of the substrate, the protective layer or both. In either case, the chemical and thermal stability of the composite or hybrid material may be compromised.

SUMMARY

In one exemplary embodiment, the present disclosure is directed to a separator substrate that includes a substrate having a bulk portion and a surface portion, the surface portion having at least one porous area with a net charge; and ionic particles coupling to at least a part of the at least one porous area, at least some of the ionic particles having a net charge of opposite sign to the net charge of the at least one porous area. In certain variations of this embodiment, other ionic particles may have a charge that is the same sign as the net charge of the at least one porous area. The coupling between the part of the at least one porous area and the ionic particles results in at least one of a chemical stability and mechanical strength of the separator substrate.

In another exemplary embodiment, the present disclosure is directed to an electrochemical cell including a separator. The separator includes a substrate having a bulk portion and a surface portion, a layer covering at least a part of the surface portion. The covered part of the surface portion being porous and the layer ionically bonded to the covered part of the surface portion. The coupling between the part of the at least one porous area and the ionic particles results in at least one of electrochemical performance, chemical stability, thermal stability, wettability, and mechanical strength of the separator substrate.

In another exemplary embodiment, the present disclosure is directed to a method for fabricating a separator. The method includes treating a substrate to yield a surface portion on the substrate with a net charge, and coupling ionic particles to at least a part of the surface portion. The ionic nanoparticles having a net charge opposite to the net charge on the surface portion and the coupling between the part of the at least one porous area and the ionic particles results in at least one of a good electrochemical performance, chemical stability, thermal stability, wettability, and mechanical strength of the separator substrate.

BRIEF DESCRIPTION OF THE DRAWINGS

FIG. 1A illustrates a typical ceramic/polymer composite material of the kind used as a battery separator in the Prior Art;

FIG. 1B is an electron micrograph of an exemplary substrate re-printed from S. S. Zhang, "A review on the separators of liquid electrolyte Li-ion batteries," *Journal of Power Sources*, Volume 164, Issue 1, 2007, page 351;

FIGS. 2A-2C illustrate an overview of an exemplary structure and assembly of a separator using ionic particles consistent with the disclosed embodiments;

FIGS. 3A-3 and 3A-4 show examples of polyelectrolytes that may be used in conjunction with the synthesis technique shown in FIG. 3A-2;

FIGS. 3C-1 and 3C-2 are schematic views of the synthesis of a hybrid material separator using the ionic nanoparticles shown in FIG. 3A-1 and FIG. 3A-2, respectively, and treated polymer substrate consistent with the disclosed embodiments;

FIG. 3D is a schematic view of the hybrid material separator of FIG. 3C-1 consistent with the disclosed embodiments;

FIGS. 4A and 4B show a schematic and a micrograph, respectively, of a double layer of ionic particles deposited on a charged substrate consistent with the disclosed embodiments;

FIG. 7C is a schematic illustration of the covering of a pore walls 510d by ionic particles 514, as also shown in FIG. 7B;

FIGS. 9A and 9B, illustrates an effect of ionic nanoparticles on wettability of a polymeric substrate by the commercial electrolyte propylene carbonate (PC), wherein FIG. 9A illustrates measured Advancing Contact Angle of PC for four different surfaces, and FIG. 9B illustrates a schematic representing the contact angle associated with each of the four different surfaces in FIG. 9A.

DETAILED DESCRIPTION

Figure 1C:
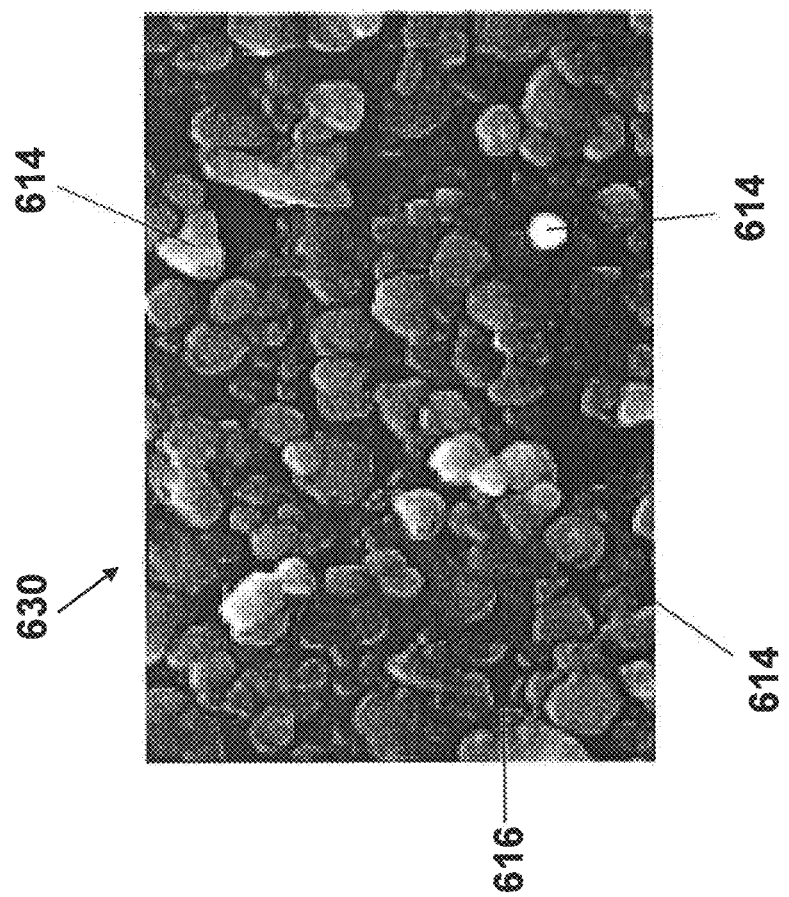
FIG. 1C shows an electron micrograph top view of a ceramic/nonwoven separator re-printed from S. S. Zhang, "A review on the separators of liquid electrolyte Li-ion batteries," *Journal of Power Sources*, Volume 164, Issue 1, 2007, page 351.

FIGS. 2A-2C illustrate an overview of the structure and assembly of a separator using ionic particles consistent with the disclosed embodiments. FIG. 2A illustrates an exemplary substrate 10 prior to a treatment. FIG. 2B illustrates the substrate 10 after an exemplary surface treatment leaving a surface area 10a of the substrate 10 with a net negative charge 12. FIG. 2C illustrates the substrate 10 after it has been exposed to oppositely-charged ionic materials 14. Although FIG. 2B shows a negatively charged substrate 10, this is merely exemplary. As will be described below, this process can proceed differently, for example, with a positively charged substrate 10 and negatively charged ionic materials 14.

FIG. 2A illustrates a substrate 10. As an example, substrate 10 is electrically non-conducting so that it may retain a net surface charge 12 on its surface area 10a or a part of it. However, in some embodiments, substrate 10 may have portions that conduct electricity and/or are that are thermally conductive. Substrate 10 may include a number of materials suitable for various applications. For example, substrate 10 may include a polymeric material, such as organic polyolefin, a composite material (e.g. polypropylene, polyethylene, polypropylene, etc.), and other materials commonly employed in electrochemical cells (e.g., cellulose, PVC, PET, PVDF). Substrate 10 may also include other types of polymeric materials and/or composite materials including, but not limited to, polypropylene, fluoropolymers such as polyvinylidene fluoride, and various other polymeric material. Other than polymeric materials, substrate 10 may be or include one or more of various inorganic, metallic or other organic materials either as a principal component, in a composite, or both.

The substrate 10 may include porous or substantially porous regions. For example, the substrate 10 may have pores throughout its bulk 10b and surface 10a regions. Alternatively, portions of the surface area 10a and/or bulk 10b of the substrate 10 may have substantial porosity while other portions of the surface area 10a and/or bulk 10b of the substrate 10 do not. For example, some portions of the surface area 10a and/or bulk 10b may lack or have less pores in order to retain structural integrity. If the substrate is to be used in harsh chemical environments, some portions of the surface area 10a and/or bulk 10b may lack pores in order to shield portions of the substrate 10 and/or other components from ambient chemicals, such as electrolytes used in electrochemical cells. For these and other applications, substrate 10 may include both porous and non-porous regions and/or other variations in porosity.

The illustration of substrate 10 in a cylindrical shape in FIG. 2A is merely exemplary, and substrate 10 may have various shapes for separator or other applications. For example, substrate 10 may be shaped as a rectangular prism and/or have an aspect ratio such that one side is considerably longer than the others (e.g., wall-shaped). Substrate 10 may, alternatively, retain its tubular or elongated shape with one of a number of different cross-sectional shapes (e.g., square, circular, triangular, various trapezoidal, etc.). Substrate 10 may also include regular or irregular shapes through its fabrication, for example the substrate 10 may include sections of cross-ply fiber that lead to regular or irregular shapes. Substrate 10 may, alternatively, have irregular or other shapes suitable for particular applications.

Figure 2D:
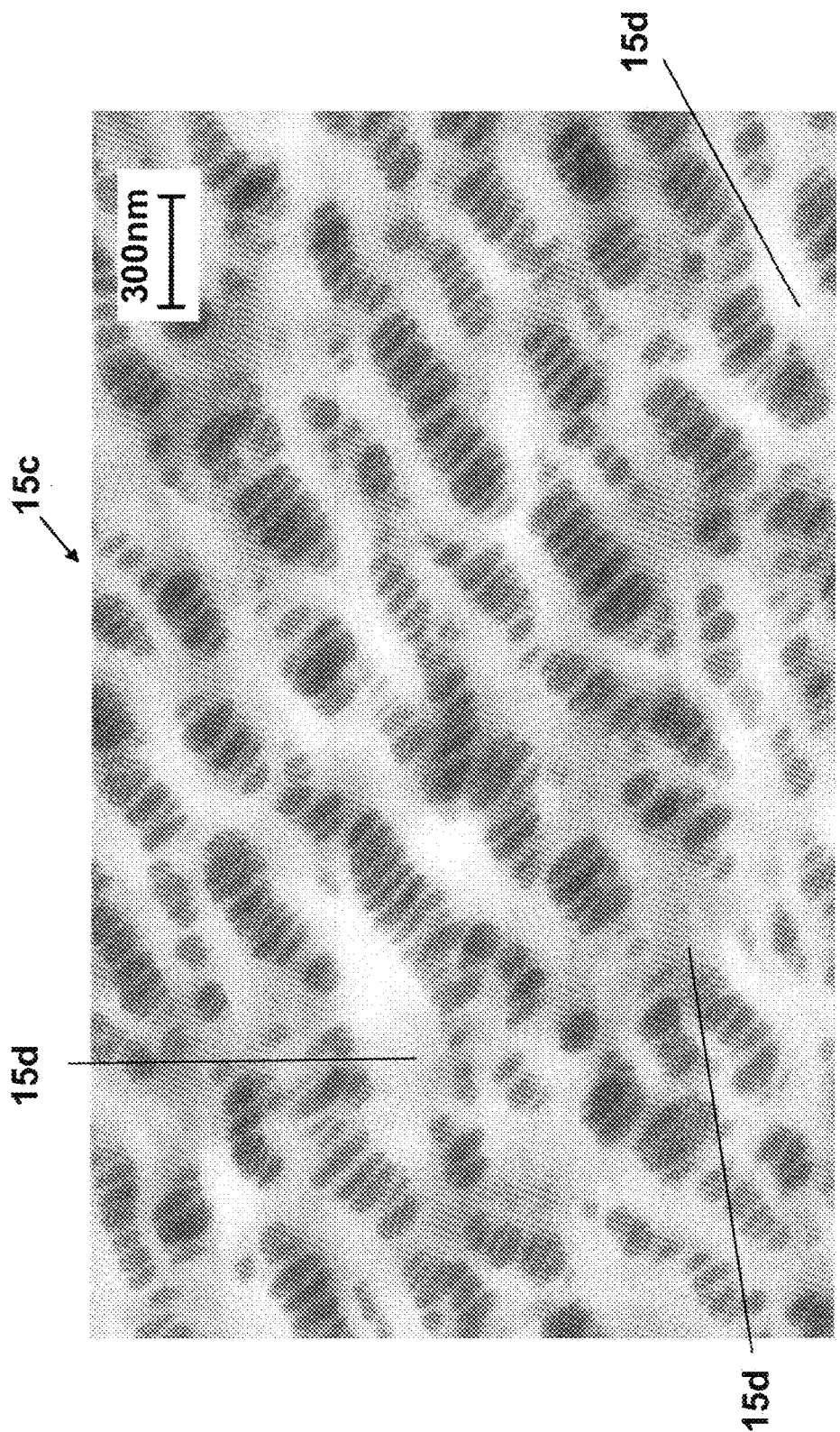
FIG. 2D illustrates an electron micrograph of an exemplary substrates consistent with the disclosed embodiments.

FIG. 2D illustrates an electron micrograph of an exemplary substrate, a micro porous polymer substrate 15c, that may be used in conjunction with the present disclosure. It is also noted that the substrate 15b of the Prior Art shown in FIG. 1B may also be used in conjunction with the present invention. Specifically, FIG. 2D illustrates a top view image of a micro porous polymer substrate 15c prior to the addition of ionic particles. FIG. 2D illustrates micro porous polymer substrate 15c having pores 15d.

FIG. 2B illustrates a treatment of substrate 10 prior to the addition of ionic materials. Generally, the treatment includes a surface treatment of a surface area 10a of substrate 10. In exemplary embodiments, the treatment imparts a net electrical charge to at least one area of the surface 10a as shown in FIG. 2B. For example, the treatment may impart a net negative charge throughout the entirety of the surface area 10a, as represented by the negative charges 12 on surface area 10a. The treatment need not impart a net charge to the entire surface area 10a, and it may be advantageous to impart a net charge to a fraction of the surface area 10a in some applications. In some cases, it may be advantageous to perform the surface treatment with a specific pattern, such as based on certain physical feature or shape of the surface area 10a. For example, a concave portion of surface area 10a may be given a net surface charge. Some of the techniques that might be used to impart a specific pattern of net charge on the surface area 10a may include photolithography, for example. In fact, certain photolithographic techniques may allow design of the dimension, location, geometry, and quantity of the treated or charged portion on the surface area 10a.

The treatment applied to the surface area 10a of the substrate may be one or more of a number of treatments suitable for imparting a charge to portions of the surface area 10a. Examples may include exposing the surface area 10a to a high energy treatment, such as exposing the surface 10a to plasma. Plasma treatment may form charged surface groups without sacrificing or substantially modifying the bulk properties of the substrate 10. The plasma treatment may include any suitable plasma with any suitable parameters. For example, 1 a microwave oxygen plasma may be applied to the substrate 10 for a duration of 5 min with at a power of 50 W at room temperature. Plasma parameters may be adjusted as needed or desired to form net surface charge 12. The plasma treatment may or may not be applied to more than one surface area 10a of the substrate 10. For example, a substrate 10 including polypropylene can be exposed to ultraviolet radiation (UV) and/or plasma, which can leave surface groups on the substrate 10 with a net charge 12. The net charge 12 may be positive, negative or a combination of the two (e.g., where the plasma parameters are changed or altered when different portions of the surface area 10a are exposed to the plasma, thus imparting different surface groups with different net charges to different portions of the surface area 10a).

The treatment may also include one of a number of other treatments, including a chemical treatment, exposure to UV radiation, etc. In some cases, the surface deposition of charged groups either from solution, vacuum or gaseous environment may be appropriate. Any suitable method for imparting a net charge to portions of the surface area 10a may be employed within the scope of the present disclosure.

The net surface charge 12 may be negative as shown in FIG. 2B or positive, in some other embodiments. The net surface charge 12 needs not be the same for all portions of the surface area 10a. For example, in some applications, it may be advantageous for some portions of the surface area 10a to be imparted with a net negative charge while other portions of the surface area 10a are imparted with a net positive surface charge. In some cases the overall distribution of net surface charge 12 across all portions of the surface area 10a may be net neutral.

FIG. 2C illustrates the addition of ionic particles 14 to the treated surface area 10a shown in FIG. 2B. Generally, the ionic particles 14 will, themselves, have a net surface charge 16. The net surface charge 16 of the ionic particles 14 may be opposite in sign to a net surface charge 12 on a portion of the surface area 10a. In this case, the ionic particles 14 may be attracted to the portion of the surface area 10a with an opposite net charge 12 to the net charge 16 ionic particles 16. Although FIG. 2C illustrates a positive net surface charge 16 of the ionic particles 14, this is merely meant to be exemplary. In other arrangements, the net surface charge 16 of the ionic particles 14 can be negative. In still other arrangements, the net surface charge 16 of some of the ionic particles 14 can be positive while the net surface charge 16 of other of the ionic particles 14 can be negative. The magnitude of the net charge of the ionic particles 14 may vary from particle to particle.

In some variations, it may be advantageous to have ionic particle 14 with uniform net surface charge 16. Such applications may include those in which a uniform or near uniform surface covering is required. Other applications may call for bi, tri or multi-modal distributions of ionic particles 14 with respect to net surface charge 16. For example, it may be advantageous, in some variations, to include some ionic particles 14 with a particularly low net surface charge 16 for adhering to aspects of the surface area 10a that are uneven (e.g., depressions and/or pores). In these and other variations, it may also be advantageous to include ionic particles 14 with a relatively low net surface charge 16 for covering other portions of the surface area 10a. In still other variations, sets of ionic particles 14 many different net surface charges 16 may be used to similar or additional effect.

Ionic particles 14 may vary in their sizes. In one embodiment, the ionic particles 14 may be in the nanometer range, such as having their diameters in the range of about 1 nm to 500 nm. In another embodiment, the ionic particles 14 may have a median diameter of about 10 nm to 30 nm. In other embodiments, the ionic particles 14 may be considerably larger in size. In still other embodiments, some of the ionic particles 14 may have diameters greater than tens of microns. The size distribution of the ionic particles 14 may be so small that the ionic particles 14 are effectively or approximately monodisperse, as shown in FIG. 2C. In other variations, the ionic particles 14 may have particularly large size distributions and even size distributions that accommodate orders of magnitude variation in diameter. These and other applications may have bi, tri or other multi-modal size distributions of ionic particles 14 suitable for a particular application. For example, larger ionic particles 14 may have a certain net surface charge 16, and smaller ionic particles 14 may have the same or different net surface charge 16. The bi-, tri-, or other multi-modal size distributions may be such that a size of the ionic particle 14 correlates with net surface charge 16 (for example, larger ionic particles 14 may have larger net surface charge 16). However, it is also possible to have bi-, tri-, or multi-modal size distributions of ionic particles 14 with identical net surface charge 16.

Although ionic particles 14 are represented as having a spherical shape in FIG. 2C, this is merely exemplary. Ionic particles 14 within the context of this application may have any suitable shape, including a geometric, round, partially rounded or fragmented shape. Ionic particles 14 may be crystallites having a fairly regular shape, or may be partially crystalline and/or amorphous. Ionic particles 13 may have a completely or partially irregular shape, may be elongated, flattened or have any other suitable shape.

Ionic particles 14 may be attracted to portions of the substrate surface area 10a with a net charge 12 opposite the net surface charge 16 of the ionic particles 14. This attraction may lead to, in some cases, ionic bonding between the ionic particles 14 and the portions of the surface area 10a of opposite net charge 12. If the strength of the ionic bonding is sufficient, in certain cases, the process yields a coated substrate 100 shown in FIG. 2C. More specifically, ionic bonding between the ionic particles 14 and portions of the surface area 10a may create a surface layer 18 of ionic particles 14 covering at least a part of the surface area 10a. In some variations, it will be advantageous for the ionic particle surface layer 18 to cover the entirety of surface area 10a. In other applications, it may be advantageous for the layer 18 to cover only a portion of the surface area 10a.

Figures 1, 3A:
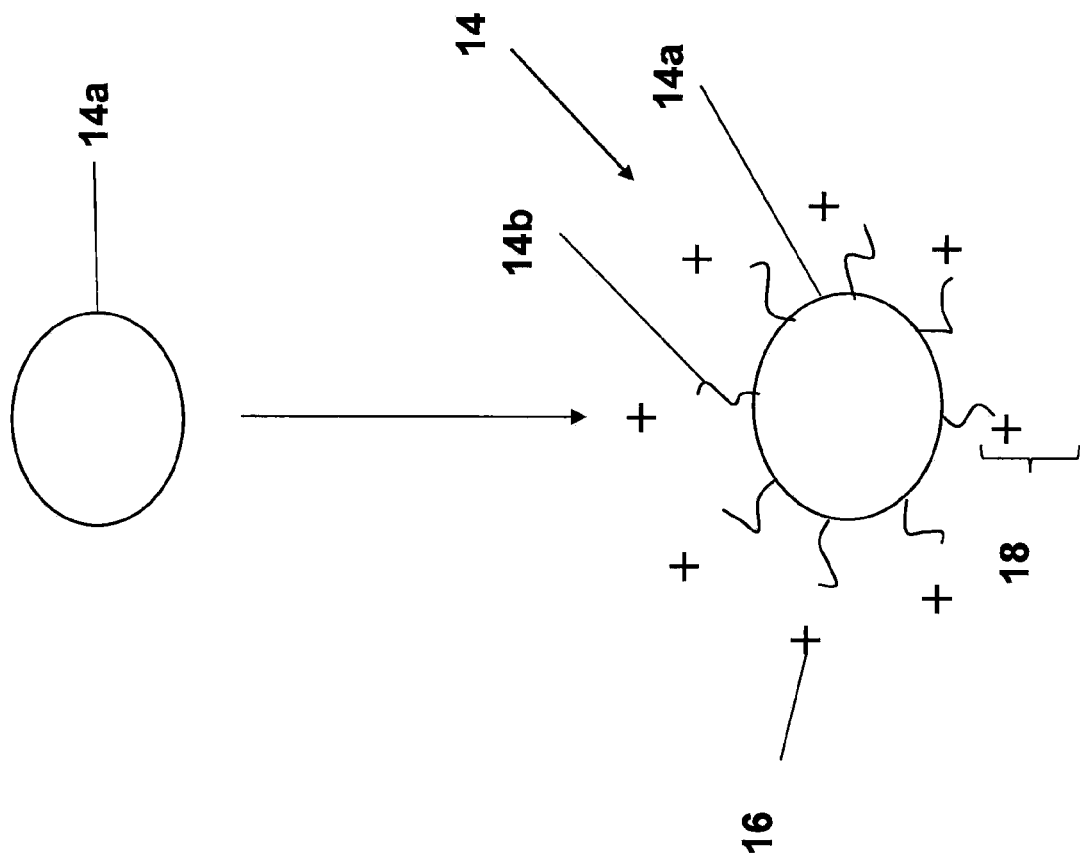
FIGS. 3A-1 and 3A-2 are schematic views of the synthesis of an ionic nanoparticles consistent with the disclosed embodiments.
Figures 2, 3A:
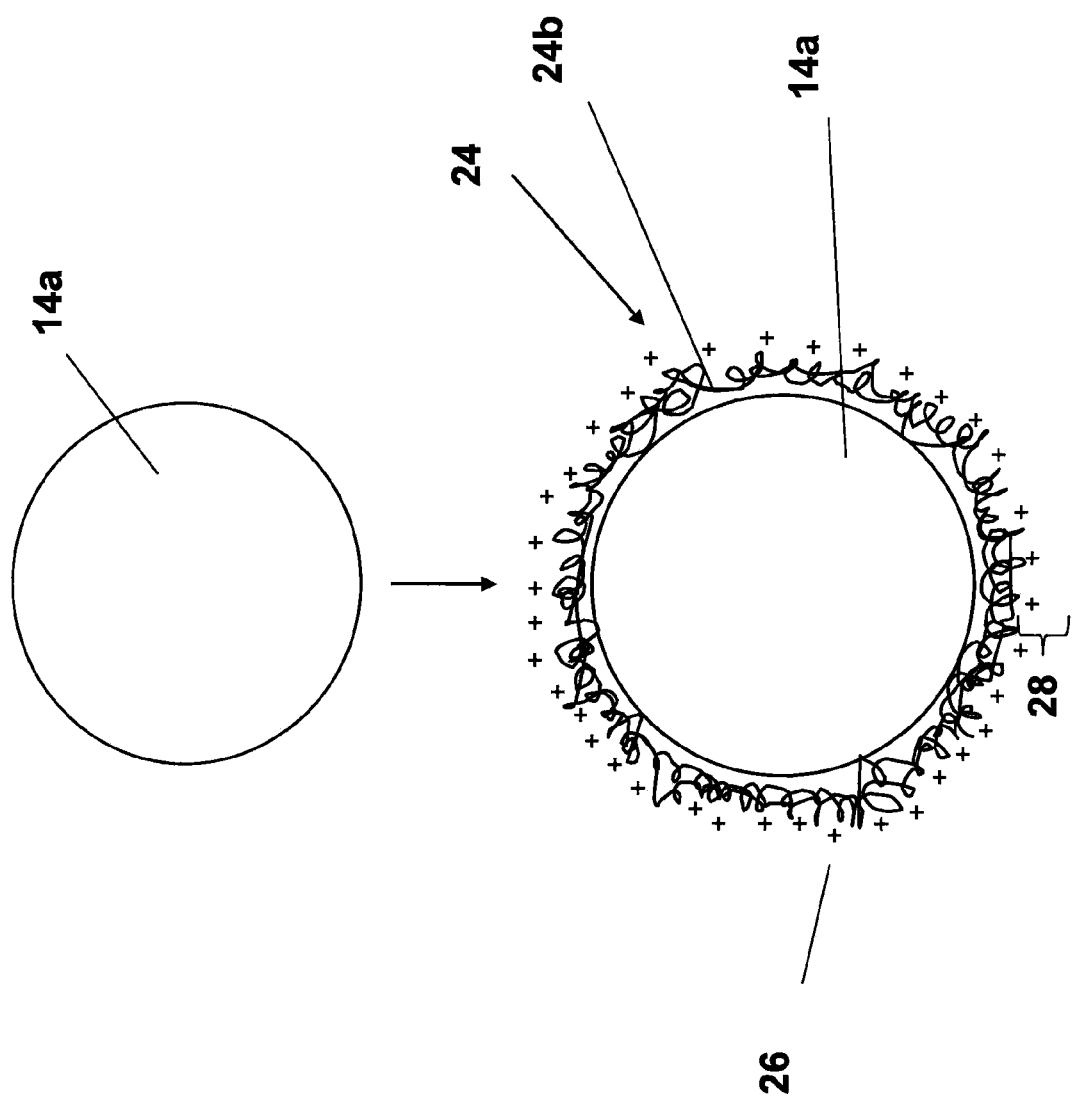
Figures 3, 3A, 4:
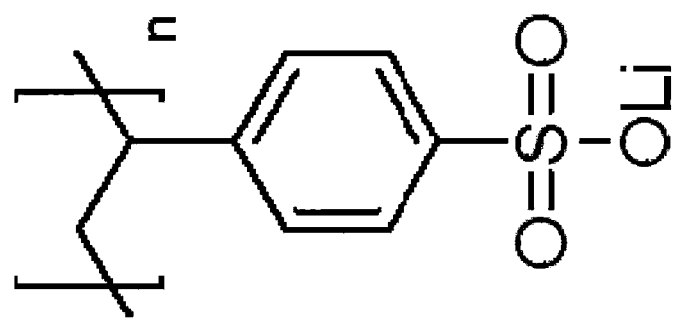
Figures 3, 3A:
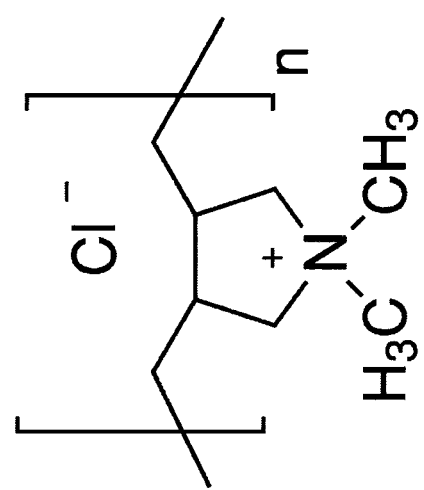
Figure 3B:
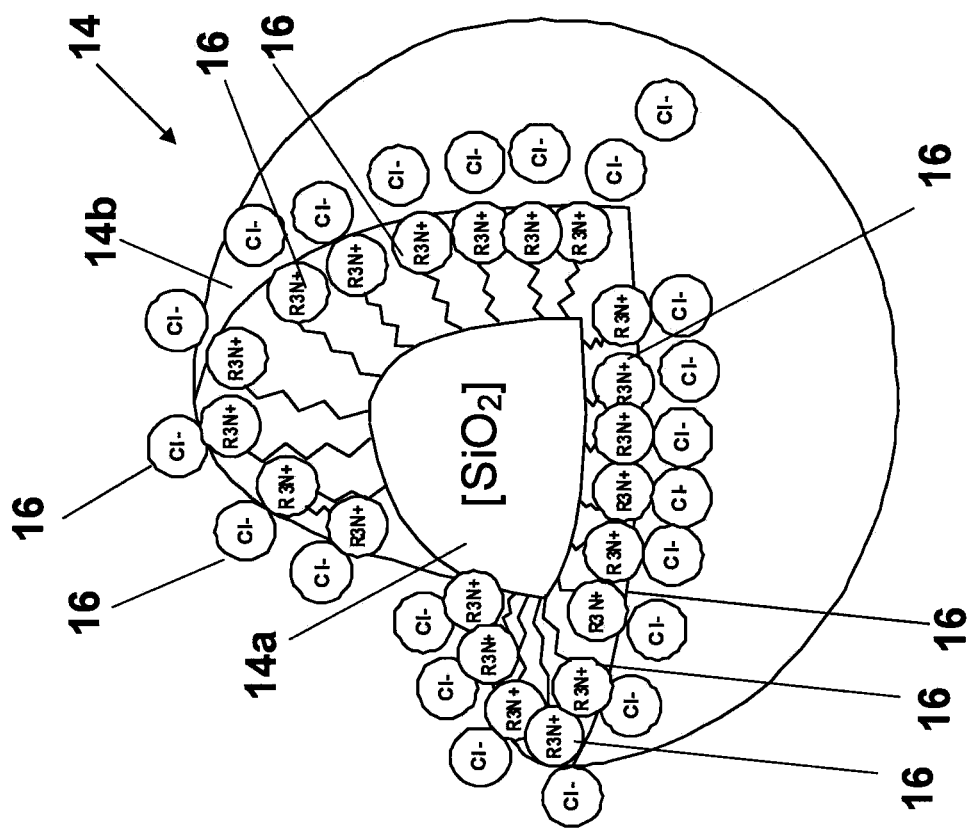
FIG. 3B is a close-up, schematic, sectional view of one type of ionic nanoparticles that may be synthesized according to the synthesis shown in FIG. 3A-1 consistent with the disclosed embodiments.

FIGS. 3A-1 and 3A-2 are schematic views of the synthesis of ionic particles, in particular ionic nanoparticles, consistent with the disclosed embodiments. FIG. 3B is a close-up, schematic, sectional view of one type of ionic nanoparticles that may be synthesized according to the synthesis shown in FIG. 3A-1 consistent with the disclosed embodiments. A core 14a (FIGS. 3A and 3B) of an ionic particle may include an inorganic material, such as a metal oxide. FIGS. 3A-3 and 3A-4 show examples of polyelectrolytes that may be used in conjunction with the synthesis technique shown in FIG. 3A-2;

This disclosure is not particularly limited with respect to the core 14a, however cores made of chemically stable and resistive material may be used. For example, metal oxides with chemical stability (chemical stability in environments containing, for example, lithium and/or electrolytes and electrolyte additives) are suitable for the core 14a material. Such lithium containing environments may include, for example, lithium ions, lithium oxide, lithium phosphate, lithium fluoride or lithium carbon compounds. Using such cores 14a may improve the chemical stability with respect to Lithium and Lithium containing compounds of a hybrid material component made from them, which would be suitable for some lithium ion battery applications. Suitable examples of metal oxides for the core 14a include, but are not limited to: $SiO_2$, $ZnO$, $SnO_2$, $TiO_2$, $ZrO_2$, $Al_2O_3$, $BaTiO_3$, $Y_2O_3$, $MgO$, $NiO$, $CaO$, $Ti_2O_5$ and combinations thereof. In addition, hollow spheres of oxide or other materials may be used as the core 14a. Cores 14a may also or alternatively include still other types of inorganic materials, such as ceramics, glass, silicon and/or metals. Cores 14a may also include or be made entirely from organic materials and/or carbon-based materials. Cores 14a may be produced by any suitable technique appropriate for the application. For example, cores 14a may be produced by precipitation techniques, sol-gel techniques or via microemulsion or nanoemulsion techniques. Cores 14a may also be made from inorganic nanocrystals or other nanocrystals in a sintering or other process. Cores 14a using thermally stable materials may also be used. For example, in certain applications, thermal stability at temperatures at around or above 150° C. may be advantageous. Suitable cores 14a with such thermal stability may include any of the cores discussed above, as well as additional materials, inorganic or organic, with suitable thermal stability. For example, a metal-oxide core may be chosen that has increased thermal stability over a polymeric or other substrate 10. In this and other cases, an ionic particle layer 30 including ionic particles 14 with cores 14a made from an exemplary metal-oxide may improve an overall thermal stability of the entire separator 100.

In some applications, cores 14a with increased wettability over a wettability of the substrate 10 may also be advantageous. In other words, a suitable core material 14a chosen from one of the above metal-oxides, other material discussed herein or other materials included by implication may improve the wettability of a separator 100 by, for example, an electrolyte, including a substrate 10 including a material of lower wettability by the same electrolyte. For example, a metal-oxide core may be chosen that has increased electrolyte wettability over a polymeric substrate 10. In this and other cases, an ionic particle layer 30 including ionic particles 14 with cores 14a made from said metal-oxide may improve an overall wettability of the entire separator 100.

In some applications, cores 14a with increased mechanical stability over a mechanical stability of the substrate 10 may also be advantageous. In other words, a suitable core material 14a chosen from one of the above metal-oxides, other material discussed herein or other materials included by implication may improve the mechanical stability of a separator 100 including a substrate 10 including a material of lower mechanical stability. For example, a metal-oxide core may be chosen that has increased mechanical stability over a polymeric substrate 10. In this and other cases, an ionic particle layer 30 including ionic particles 14 with cores 14a made from said metal-oxide may improve an overall mechanical stability of the entire separator 100. In many cases, it is advantageous to choose a core 14a material that is substantially insulating or non-conducting, such as a metal-oxide, to avoid or decrease short-circuiting across the ionic particle 14 interior. In some applications, cores 14a with wettability, especially a wettability relating to an electrolyte, over a wettability of the substrate 10 may also be advantageous. In other words, a suitable core material 14a chosen from one of the above metal-oxides, other material discussed herein or other materials included by implication may improve an electrolyte wettability of a separator 100 including a substrate 10 including a material of electrolyte wettability. For example, a metal-oxide core may be chosen that has increased electrolyte wettability over a polymeric substrate 10. In this and other cases, an ionic particle layer 30 including ionic particles 14 with cores 14a made from said metal-oxide may improve an electrolyte wettability of the entire separator 100. Core materials 14a may be chosen for increased wettability with respect to any fluid or electrolyte used in a variety of applications, including battery applications. Examples of suitable electrolytes include, but are not limited to, propylene carbonate (PC) as well as other commercially and non-commercially available electrolytes.

Core materials 14a may also be chosen such that the separator 100 has good electrochemical performance or properties. Such properties may include, for example, that the separator 100 has lower resistance, good electrolyte retention and a moderate ion transfer number. In these and other embodiments, the core materials 14a may be chosen such that the separator 100 has faster discharging and or charging performance. Core materials 14a may also be chosen such that a battery in which the separator 100 is used has a higher energy transfer or delivery efficiency at higher or lower charging/discharging rates.

As shown in FIG. 3B, the core 14a may be activated or processed using a graft agent and/or anchor group 14b coupled with the core 14a. Any suitable graft agent 14b that binds to the core 14b may be used. Examples of suitable graft agents 14b include, but are not limited to: trialkoxysilanes, phosphonates, sulfonates and/or other bidentate ligands. Additional examples of suitable graft agents 14b include primary amine-containing silane, secondary amine-containing silane, tertiary amine-containing silane, quaternary amine-containing silane, carboxylic containing silane, sulfonate containing silane or phosphate-containing silane. Suitable graft agents 14b comprise at least one of multi-functional (n≥2) terminals and at least one of following elements: N, S, B, P, C, Si, and O.

The graft agent 14b may further include a functional group 18 having a net charge 16, as shown schematically in FIG. 3A-1. Suitable functional groups 18 include, but are not limited to, nitrogen-containing functional groups 18 a single positive charge, as shown in FIG. 3B. Examples of the latter include, for example, NR4+ groups (where R can be a number of elements, including hydrogen), ammonium groups (NH4+), etc. However, any suitable functional group have a net charge, positive or negative, may be used with the graft agent 14b. Although FIG. 3B shows Cl— as an anion, this is merely exemplary. Any suitable anions may be used. Other suitable anions include bromide, fluoride, iodide and other suitable anions.

Alternatively, or in addition to using a graft agent 14b, cores 14a may be modified using a polyelectrolyte in a number of techniques known in the art. Suitable techniques include, for example, consecutively assembling silica nanoparticles and polymer onto colloids and subsequently removing the templated colloid either by calcination or decomposition upon exposure to solvents. See, for example, Frank Caruso, *Science*, 282, 1111 (1998). As shown in FIG. 3A-2, the synthesis of ionic particles 24 using a polyelectrolyte 24b may substantially parallel the synthesis of ionic particles 14 using graft agents 14b, as shown in FIG. 3A-1. The process shown in FIG. 3A-2 differs from the process shown in FIG. 3A-2 in that, among other things, there is no covalent bonding between the polyelectrolyte 24b and the core. However, it is to be understood that ionic particles 24 synthesized using the process shown in FIG. 3A-2 may include substantially all the properties, attributes and characteristics discussed in the context of ionic particles 14 herein. In other words, discussion of ionic particles 14 that follows applies equally well to ionic particles 24 synthesized by the process shown in FIG. 3A-2. Moreover, any of the examples and applications discussed herein relating to ionic particles 14 apply equally well to ionic particles 24.

Suitable polyelectrolytes 24b used in the process shown in FIG. 3A-2 may include polyelectrolytes with a net charge, positive or negative. FIGS. 3A-3 and 3A-4 show examples of polyelectrolytes that may be used in conjunction with the synthesis technique shown in FIG. 3A-2. FIG. 3A-3 shows an exemplary cationic polyelectrolyte, Poly(diallyldimethylammonium chloride). FIG. 3A-4 shows an exemplary anionic polyelectrolyte, Poly(4-styrenesulfonic acid) lithium. However, it is to be understood that any suitable polyelectrolyte may be used. Other examples of suitable polyelectrolytes include, for example: Poly(allylamine hydrochloride), Poly (sodium 4-styrenesulfonate), Poly(vinylsulfonic acid, sodium salt), Poly(p-xylene tetrahydrothiophenium chloride), and Poly(acrylic acid sodium salt). Suitable polyelectrolytes may be have any suitable charge 28 to impart a net charge 26 to the surface of ionic particles 24. Charges 28 and 26 may be positive or negative. In addition, combinations of positive and negative charges 28 and 26 may also be used.

The process shown in FIG. 3A-2 may include, for example, deposition of oppositely charged polyelectrolyte 24b onto colloidal particles 14 at particular pH value. In this case, primarily electrostatic interactions may cause polyelectrolyte layers 24b to "build-up" or accumulate on the colloidal particles 14. The accumulation may create ionic particles 24. Excess polyelectrolyte 24b can be removed by centrifugation or filtration. Excess cationic (or anionic) groups of deposited polyelectrolyte 24b is common and may interact with surface and non-utilized charged groups of the colloidal particles 14, which may cause charge overcompensation and assist the electrostatic binding of the multiple polyelectrolyte layers 24b to the colloidal particles 14. FIGS. 3C-1 and 3C-2 are schematic views of the synthesis of a hybrid material separator using the ionic nanoparticles shown in FIG. 3A-1 and FIG. 3A-2, respectively, and treated polymer substrate consistent with the disclosed embodiments. FIG. 3D is a schematic view of the hybrid material separator of FIG. 3C-1. Ionic particles 14 synthesized, as described in the context of FIGS. 3A-1 and 3B or FIG. 3A-2 may be, for example, suspended in solution 20. Solution 20 may then be brought into contact with the substrate 10 and, more particularly, with the surface area 10a having a net charge 12. Suitable methods for exposing the solution 20 and the ionic particles 14 or ionic particles 24 to the substrate 10 may include dip coating, spray coating, slot die coating, flow coating, gravure coating, inkjet printing the ionic nanoparticles onto the surface portion. When the net charge 12 of the surface area 10a and the net charge 16 of the ionic particle 14, or the net charge 26 of the ionic particle 24, are opposite in sign (shown, for purposes of illustration and example, in FIGS. 3C-1 and FIG. 3C-2 as negative and positive, respectfully), ionic bonding between the ionic particles 14 or 24 and the surface area 10a may occur. In this case, ionic particles 14 or 24 may bind to the surface area 10a to form a layer 30 of ionic particles 14 or 24 on the separator 100, as shown in FIG. 3D. FIG. 4 is a transmission electron microscopy image of ionic nanoparticles synthesized according to the process shown in FIG. 3A consistent with the disclosed embodiments. Similarly, ionic particles 24 may bind to the surface area 10a to form a layer 30 of ionic particles 24 on the separator 100.

Solution 20 may be one of a number of suitable solutions for deposition of the ionic particles 14 or 24. Suitable solutions include, for example, water (purified, de-ionized and/or with additives or other additions), various suitable organic solvent (e.g., ethanol, ethanol, acetone) or mixtures of these and other solutions. While a number of different solutions 20 may be used, important aspects include the zeta potential (ζ) of the ionic particles 14 or 24 in the solution 20, which can be related to the overall charge acquired by the ionic particles 14 or 24 in the solution 20. Ionic particles 14 or 24 with relatively low ζ (e.g., −30 mV<ζ<30 mV) in solution 20 may lead to weak or low net surface charges 12 and, therefore, to aggregation of the particles. The magnitude of ζ may scale with a repulsive force between the ionic particles 14 or 24 and, therefore, may be inversely related to the tendency of the ionic particles 14 or 24 to flocculate or agglomerate. Ionic particles 14 or 24 with relatively high ζ (e.g., −30 mV>ζ or ζ>30 mV) in solution 20 may lead to high surface charges 12 and, therefore, to strong particle-particle repulsive forces. Ionic particles 14 or 24 with low surface charge 12 may tend to aggregate. Ionic particles with relatively high surface charge 12 may experience such strong repulsive interaction that efficient coating of the surface area 10a is inhibited or diminished. Altering the characteristics of the solution 20, such as the pH, may alter ζ for a particular set of ionic particles 14 or 24 and may, correspondingly, alter deposition characteristics. For example, ionic particles 14 or 24 with a relatively large, positive ζ in the solution 20 may result in patchy coverage of some surfaces, such as polypropylene. Decreasing ζ may lead to more uniform coverage. Although a range of pHs may be used in the instant application, it may be advantageous to tailor the pH, the ζ and the surface charge of the ionic particles 14 or 24 for a particular application. Generally a pH in the range of 1-10 is suitable, although it may be advantageous in some applications to use pHs outside this range. Generally, a range in ζ of −70 mV to 70 mV is suitable for creating relatively uniform, stable layers of ionic particles 14 or 24 on polymeric substrates 10. However, it is to be understood that techniques described herein may be applied with any suitable ζ and, in fact, ζ may be adjusted or altered to provide desired coverage of surface area 10a.

Although FIG. 3D illustrates the layer 30 as a homogeneous distribution of ionic particles 14 on the substrate 10, this is merely exemplary. In fact, the ionic particles 14 may cluster, cover and/or adhere to different portions of the surface area 10a of the substrate 10, as discussed above.

Figure 4B:
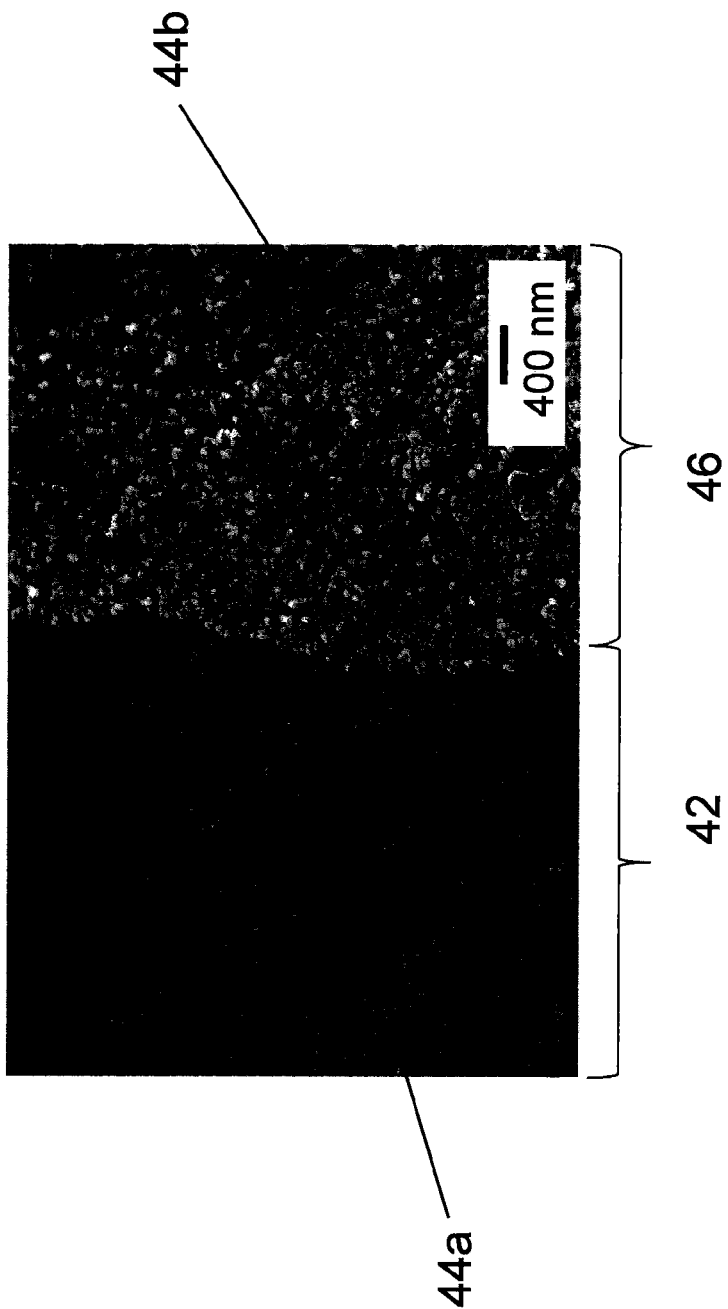

FIGS. 4A and 4B show a schematic and a micrograph, respectively, of a double layer of ionic particles deposited on a charged substrate consistent with the disclosed embodiments. FIG. 4A is a cross-section showing a first layer 42 of positively charged ionic nanoparticles 44a deposited on a negatively charged substrate 10. Deposition procedures for the first layer 42 may be according to those described above in the context of ionic particles 14 and layer 30. Once first layer 42 is deposited, either as a monolayer or multi-layers, as shown in FIG. 4A, a second layer 46 of negatively charged ionic particles 44b may be deposited on top of the first layer 42. Although both FIGS. 4A and 4B show the negatively charged ionic particles 44b as substantially larger than the positively charged ionic particles 44a, this is merely exemplary. The particles 44a and 44b may have any suitable size arrangement (e.g., 44a may be larger than 44b, vice versa or the same size, etc.). Moreover, the particular charge arrangement is merely exemplary. For example, substrate 10 may be positively charged, ionic particles 44a negatively charged and ionic particles 44b positively charged. Those skilled in the art will recognize other combinations explicitly mentioned, implicated, implied or not explicitly mentioned that should also be considered variations of the present inventions.

FIG. 4B shows the result of the double layer deposition. As shown in FIG. 4B, the two layers 42 and 46 are distinct. Although FIG. 4B shows a partial double layer, it is to be understood that any suitable pattern is within the context of the present invention. For example, layer 46 may be patterned onto layer 42 in such a way as to create islands, stripes or other patterns of ionic particles 44b. Those skilled in the art will recognize that various arrangements of these layers 42 and 46, various patterns, etc. will be within the context of the present invention.

Figure 5A:
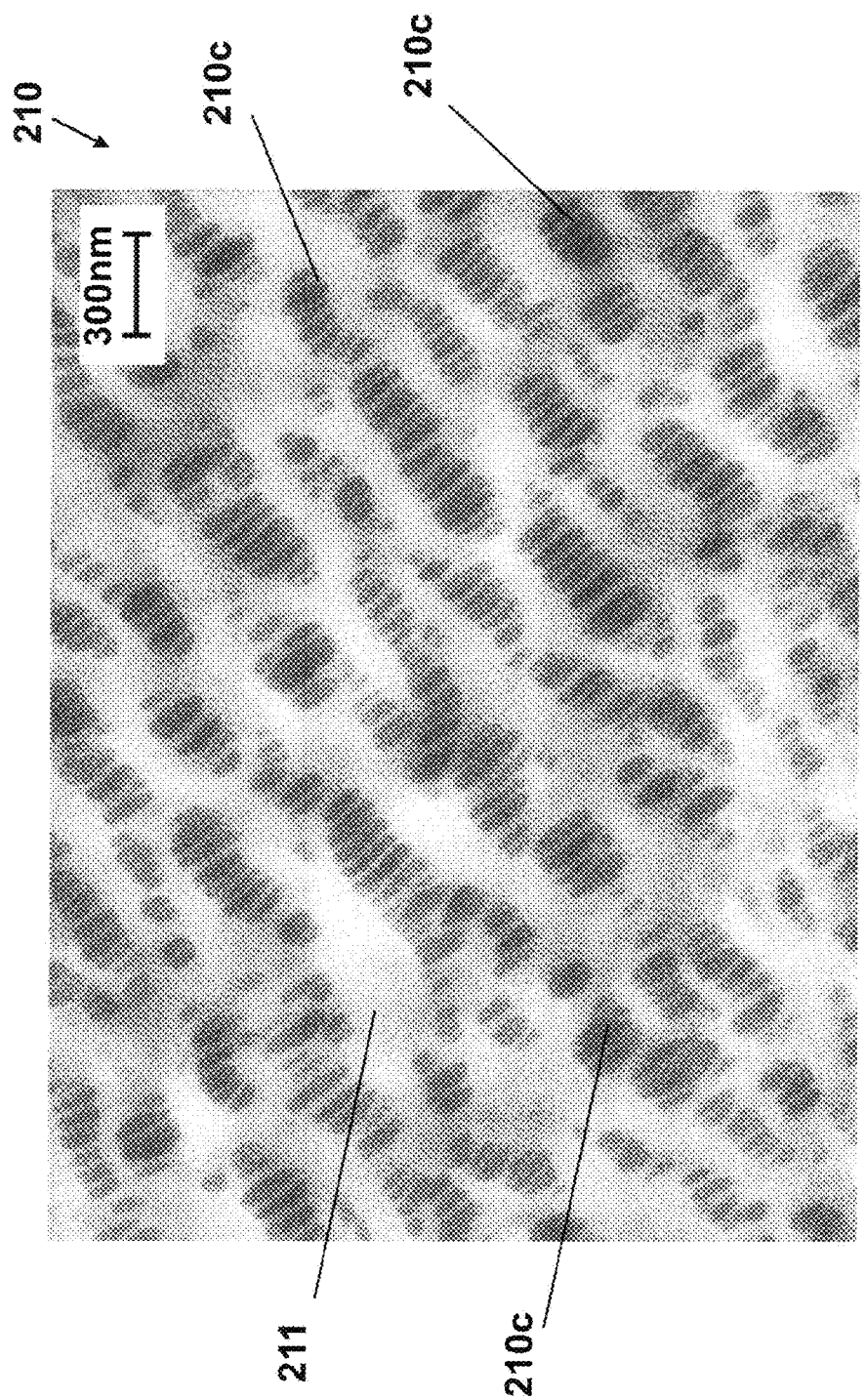
FIGS. 5A-5C show micrographs giving an overview of the structure and assembly of a separator using ionic particles and a conventional polymeric separator material corresponding to the steps shown in FIG. 2.
Figure 5B:
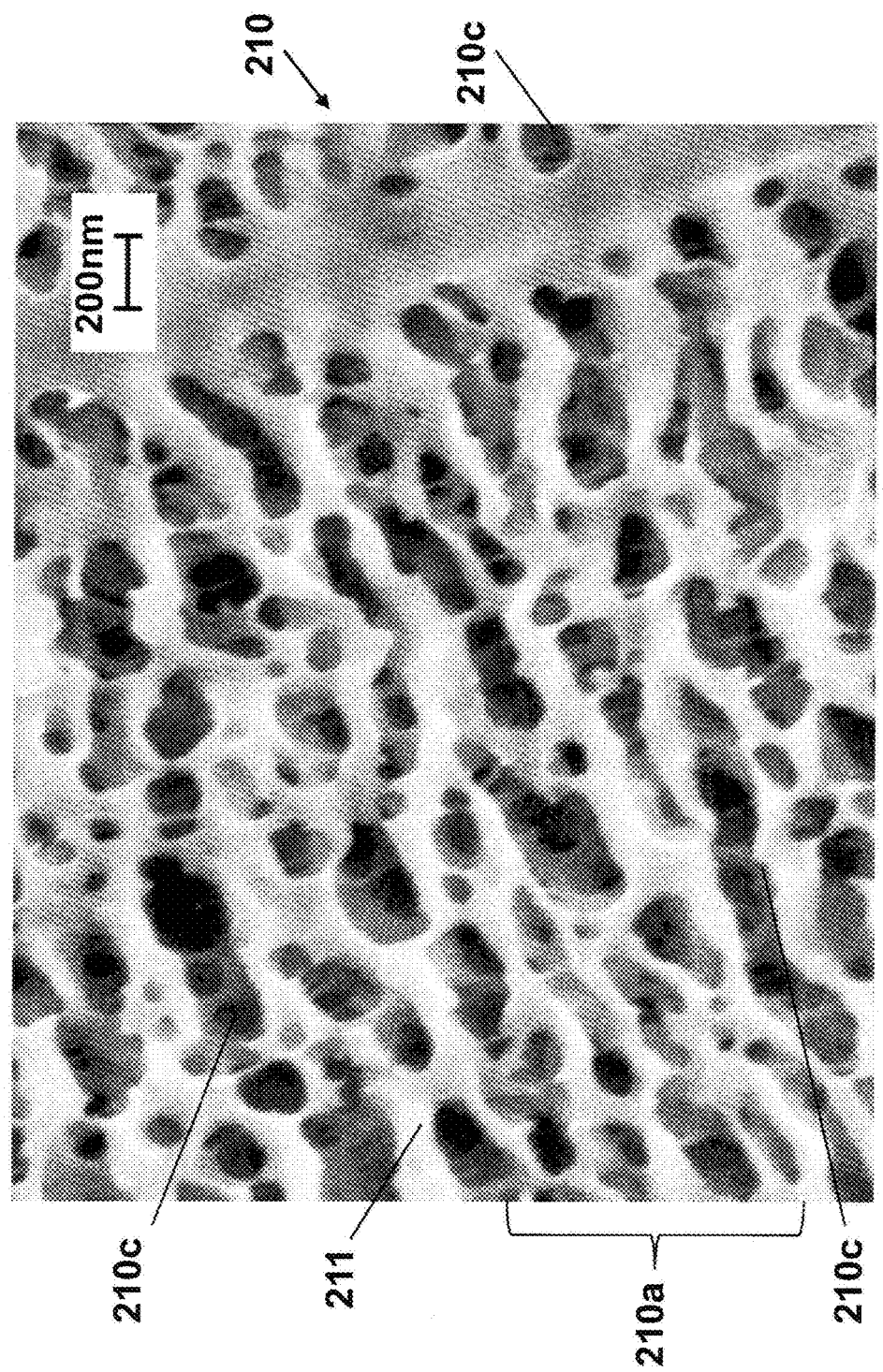
Figure 5C:
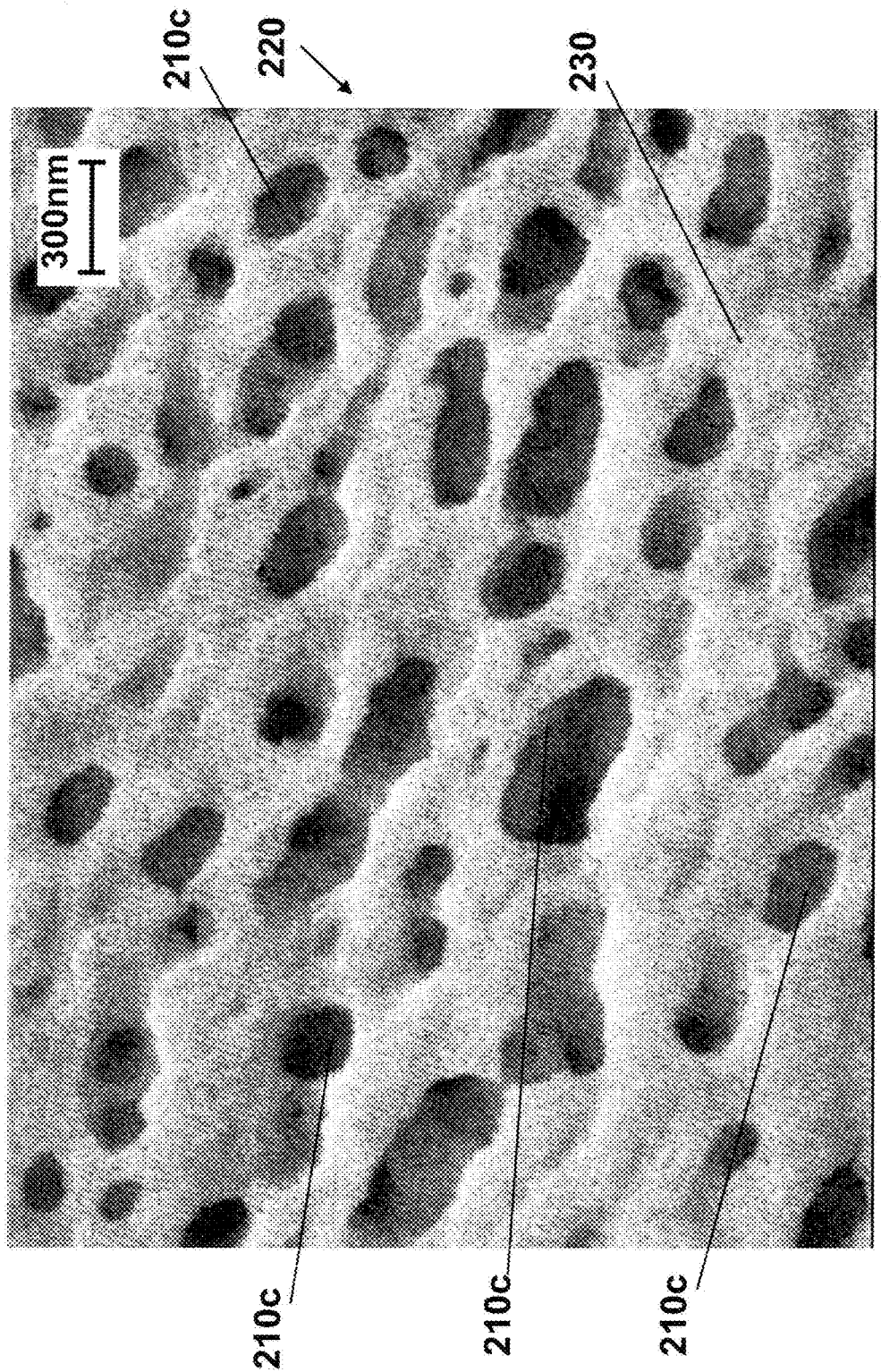

FIGS. 5A-C show micrographs giving an overview of the structure and assembly of a separator using ionic particles and a conventional polymeric separator material corresponding to the steps shown in FIG. 2. In FIG. 5A, a substrate 210 is a commercially available polymer separator for an electrochemical cell (Celgard 2320). As shown in FIG. 5A, substrate 210 is porous having multiple pores 210c that are clearly visible in the micrograph. FIG. 5B shows the substrate 210 of FIG. 5A after plasma treatment such that surface area 210a retains a net negative charge. Pores 210c are still visible in the treated surface 210a, as shown in FIG. 5B. FIG. 5C shows surface area 210a after being exposed to ionic nanoparticles 214 consisting of a silica core 214a and a graft agent 214b including positively charged ammonium. FIG. 5C shows roughly uniform and homogeneous layer 230 of ionic nanoparticles 214 covering surface area 210a. Moreover, as can be seen in FIG. 5C, many of the pores 210c present in the substrate 210 are substantially unobstructed by the ionic particle layer 230.

Figure 5D:
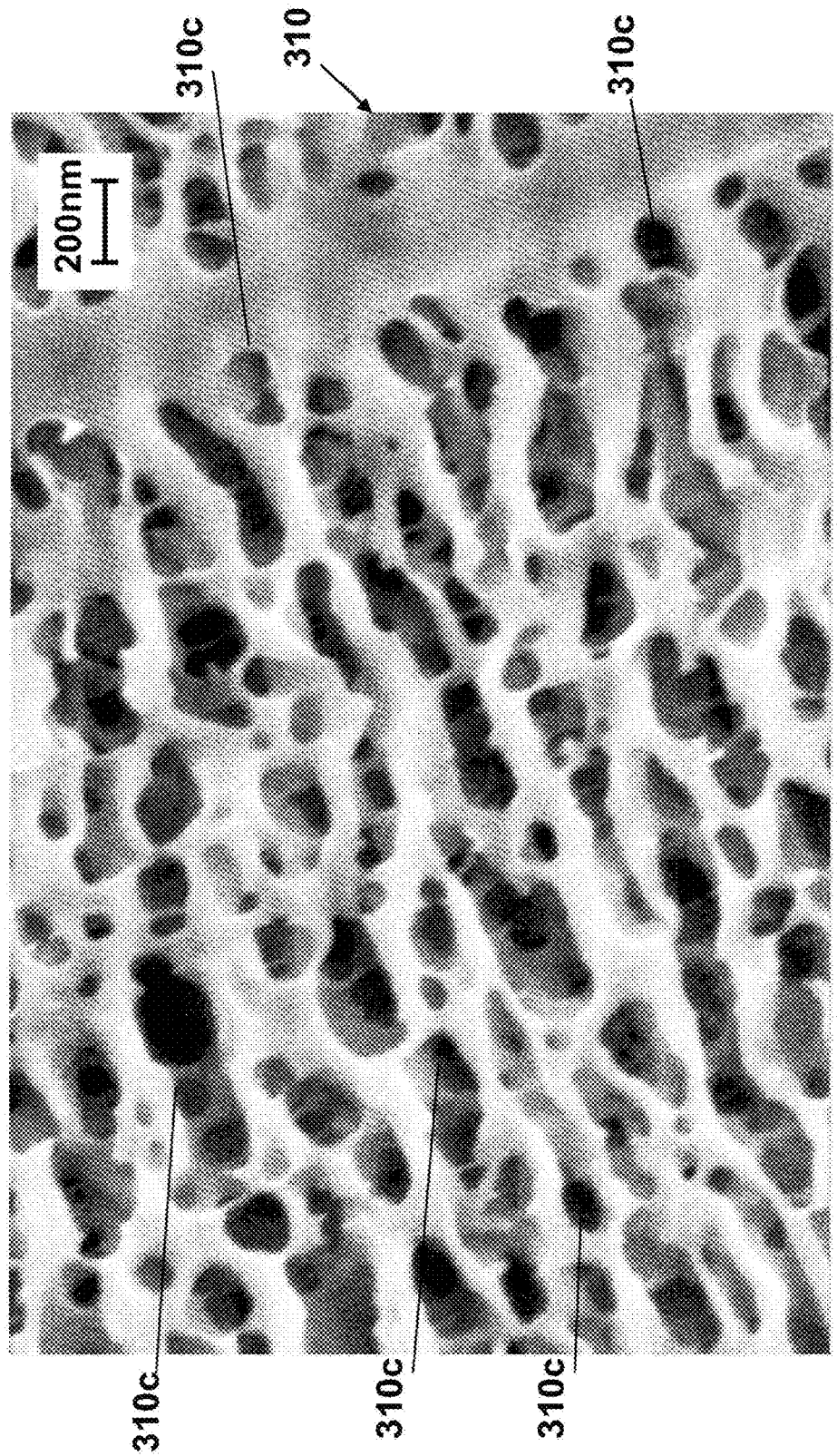
FIGS. 5D-5E show micrographs giving an overview of the structure and assembly of a separator using relatively large ionic particles and a conventional polymeric separator material corresponding to the steps shown in FIGS. 2A-2C.
Figure 5E:
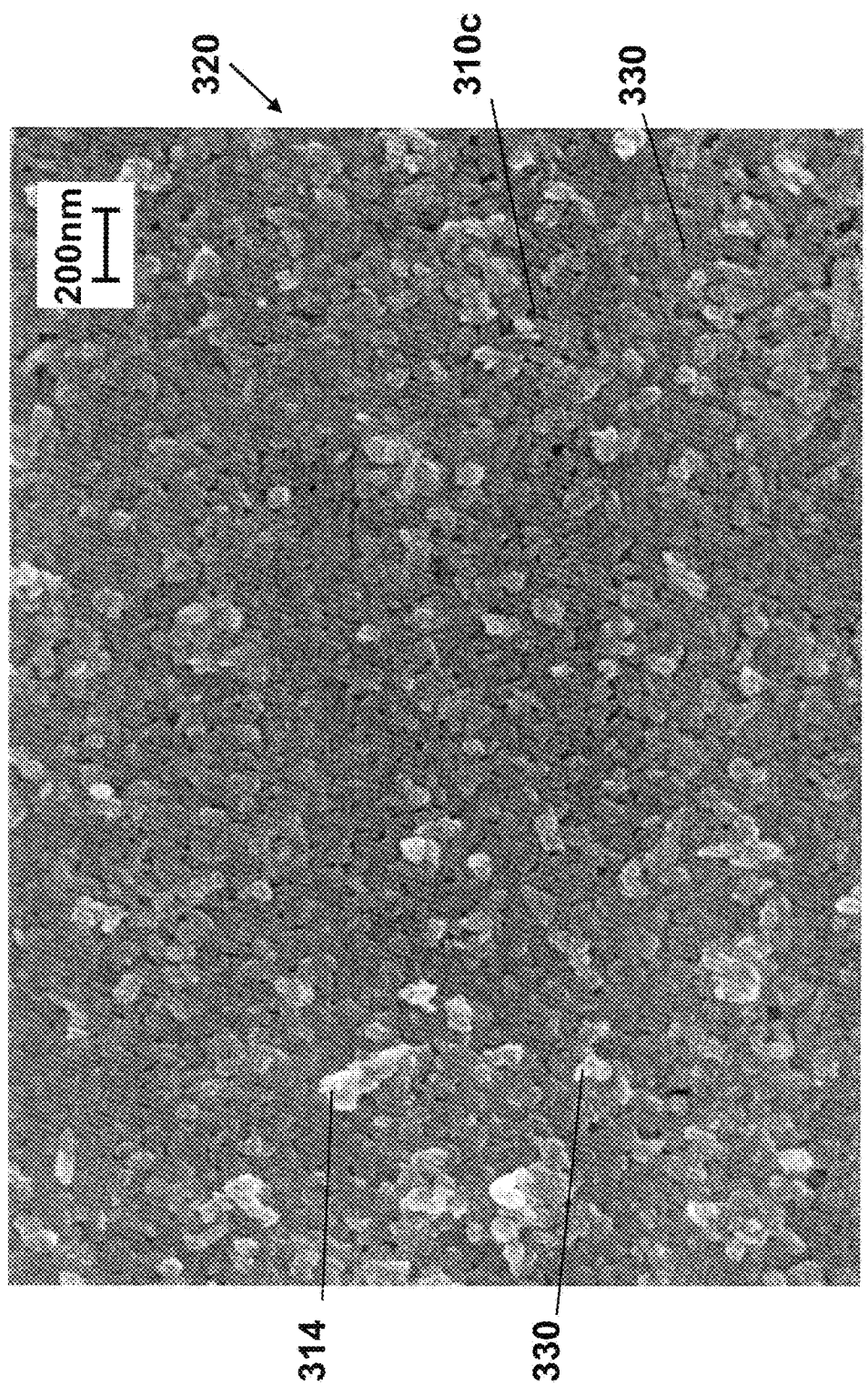

FIGS. 5D-5E show micrographs giving an overview of the structure and assembly of a separator using relatively large ionic particles and a conventional polymeric separator material corresponding to the steps shown in FIG. 2A-2C. In FIG. 5D, a substrate 310 is a commercially available polymer separator for an electrochemical cell (Celgard 2320) after plasma treatment at such that surface area 310a retains a net negative charge. As shown in FIG. 5D, substrate 310 is porous having multiple pores 310c that are clearly visible in the micrograph. FIG. 5E shows surface area 310a after being exposed to ionic nanoparticles 314 consisting of a TiO2 core 314a and a graft agent 314b including positively charged ammonium. FIG. 5E shows roughly uniform layer 330 of ionic nanoparticles 314 covering surface area 310a. Moreover, as can be seen in FIG. 5E, some of the pores 310c present in the substrate 310 are still visible even when covered by the ionic particle layer 330. The ionic nanoparticles 314 of the ionic particle layer 330 are considerably larger than the ionic nanoparticles 214 shown in FIG. 5C. Moreover, the ionic nanoparticles 314 are considerably more irregular in shape and size distribution than ionic nanoparticles 214. These results show some of the considerable variation that is possible by changing the particle core, deposition parameters and layer patterning.

Figure 6A:
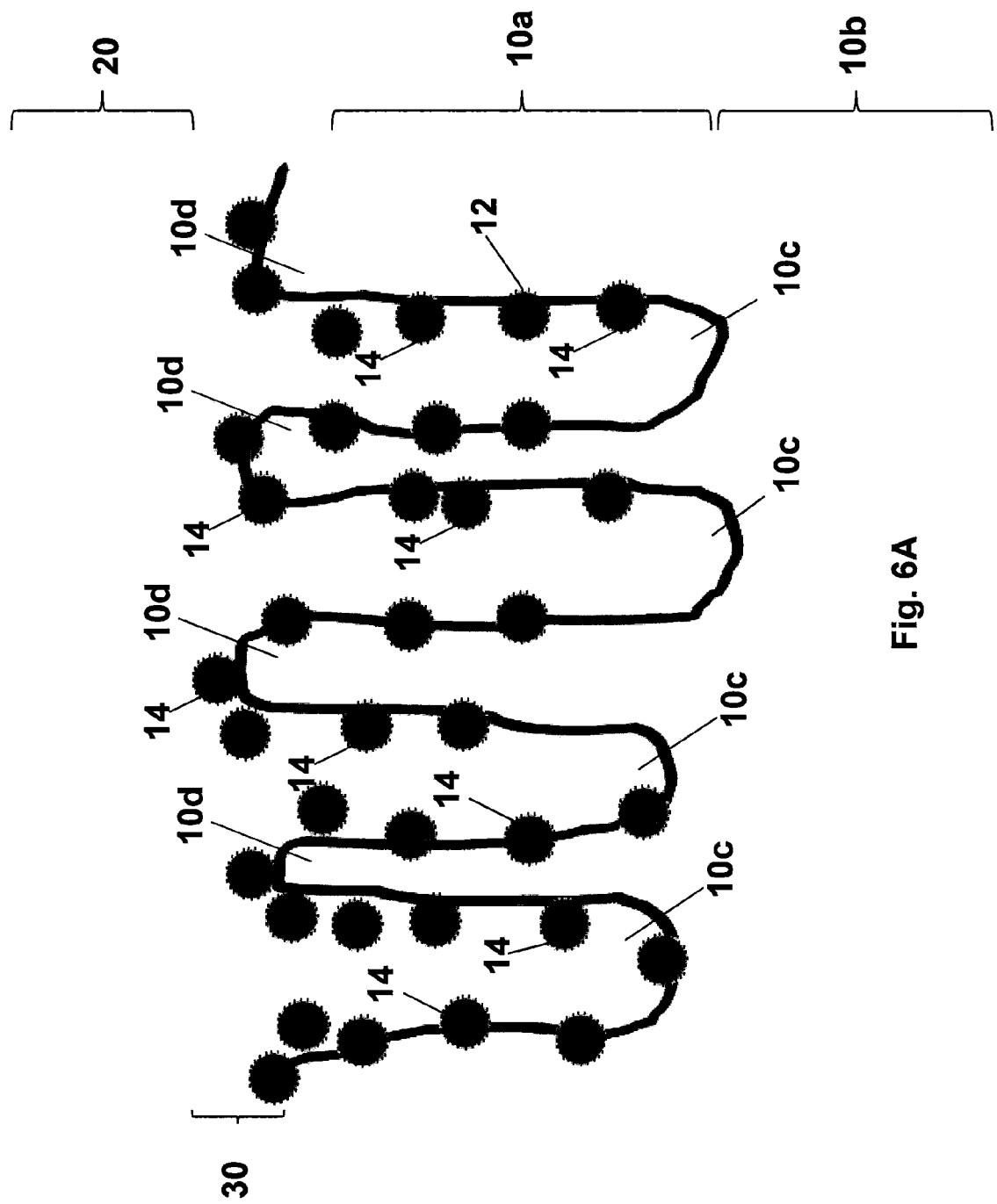
FIGS. 6A-6E illustrate different mechanisms for achieving surface layers of ionic nanoparticles on a porous polymer substrate based on the relative charge density on the ionic nanoparticles consistent with the disclosed embodiments.
Figure 6B:
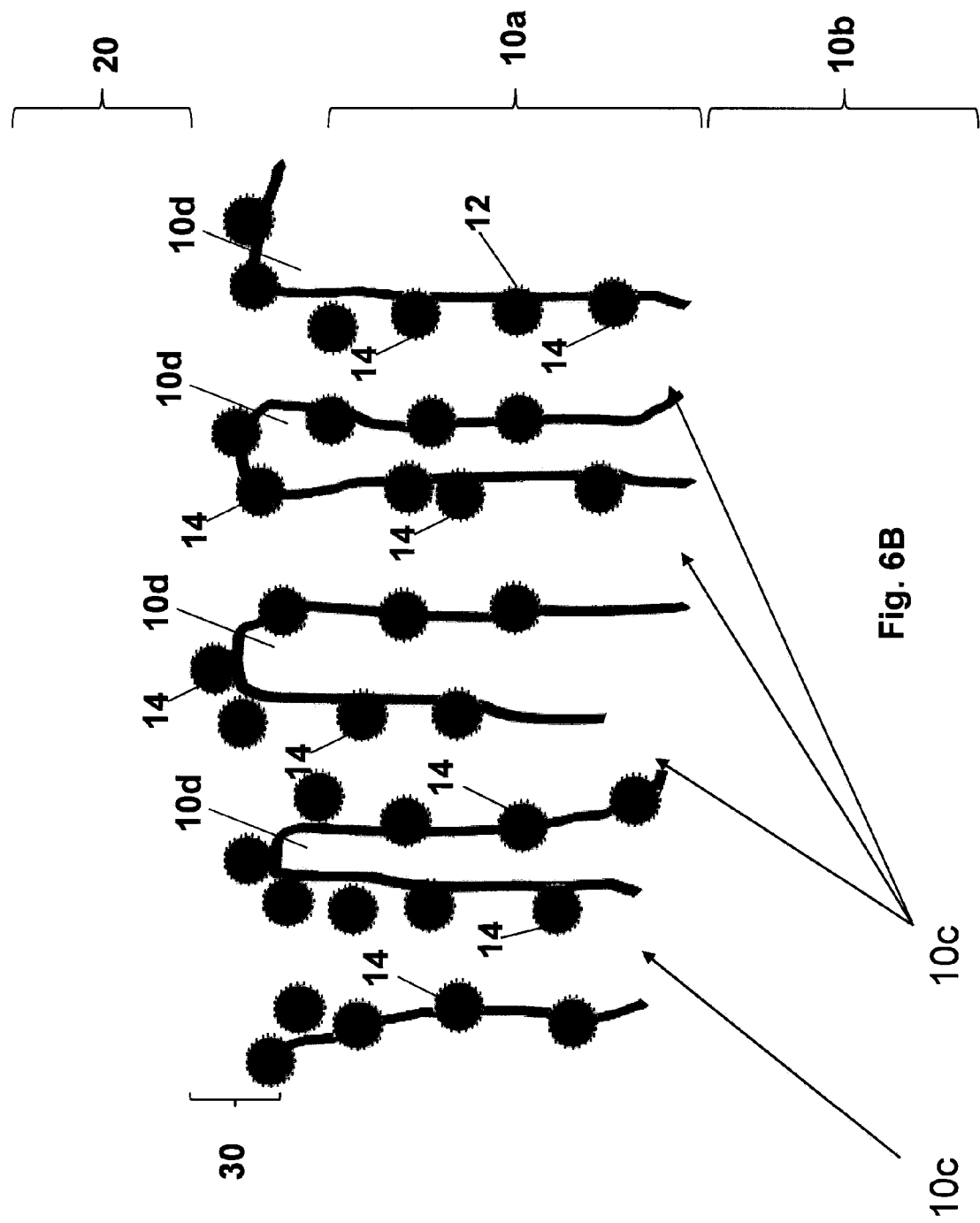
Figure 6C:
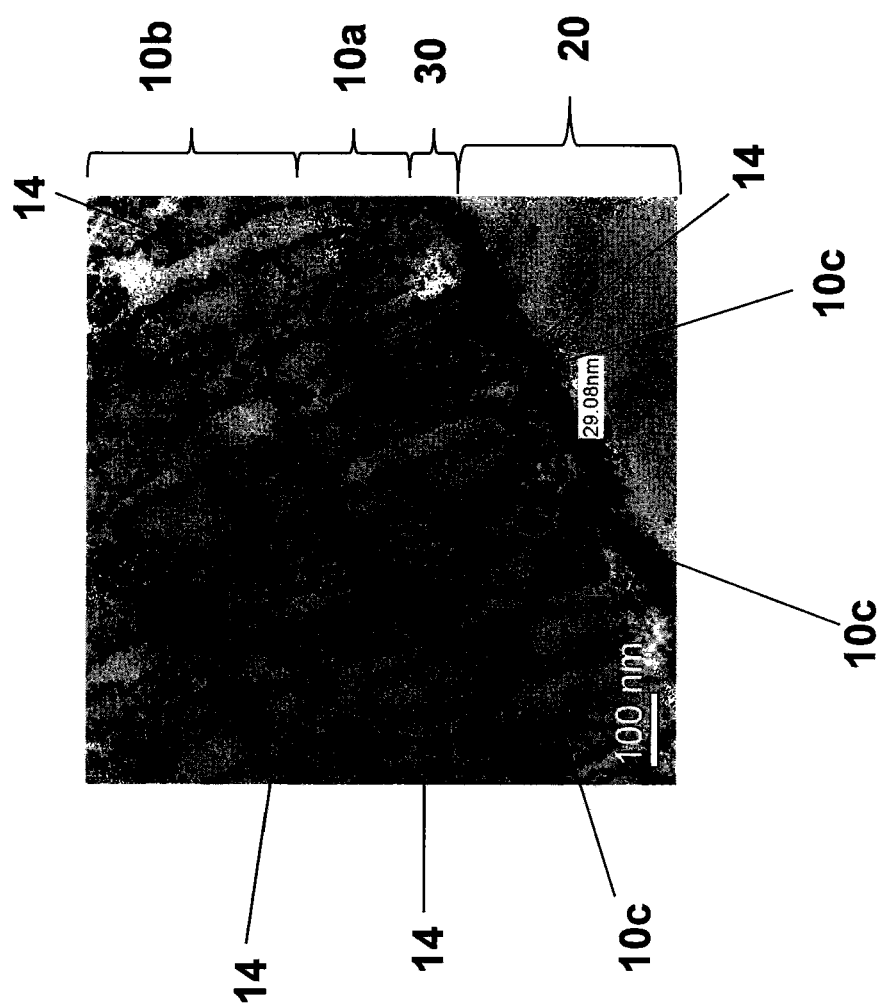
Figure 6D:
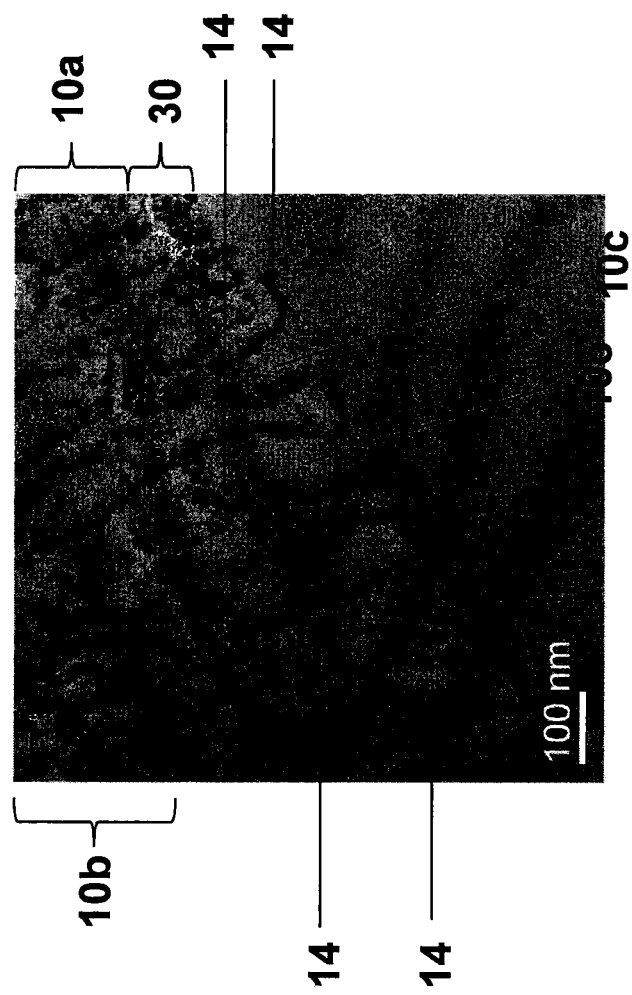
Figure 6E:
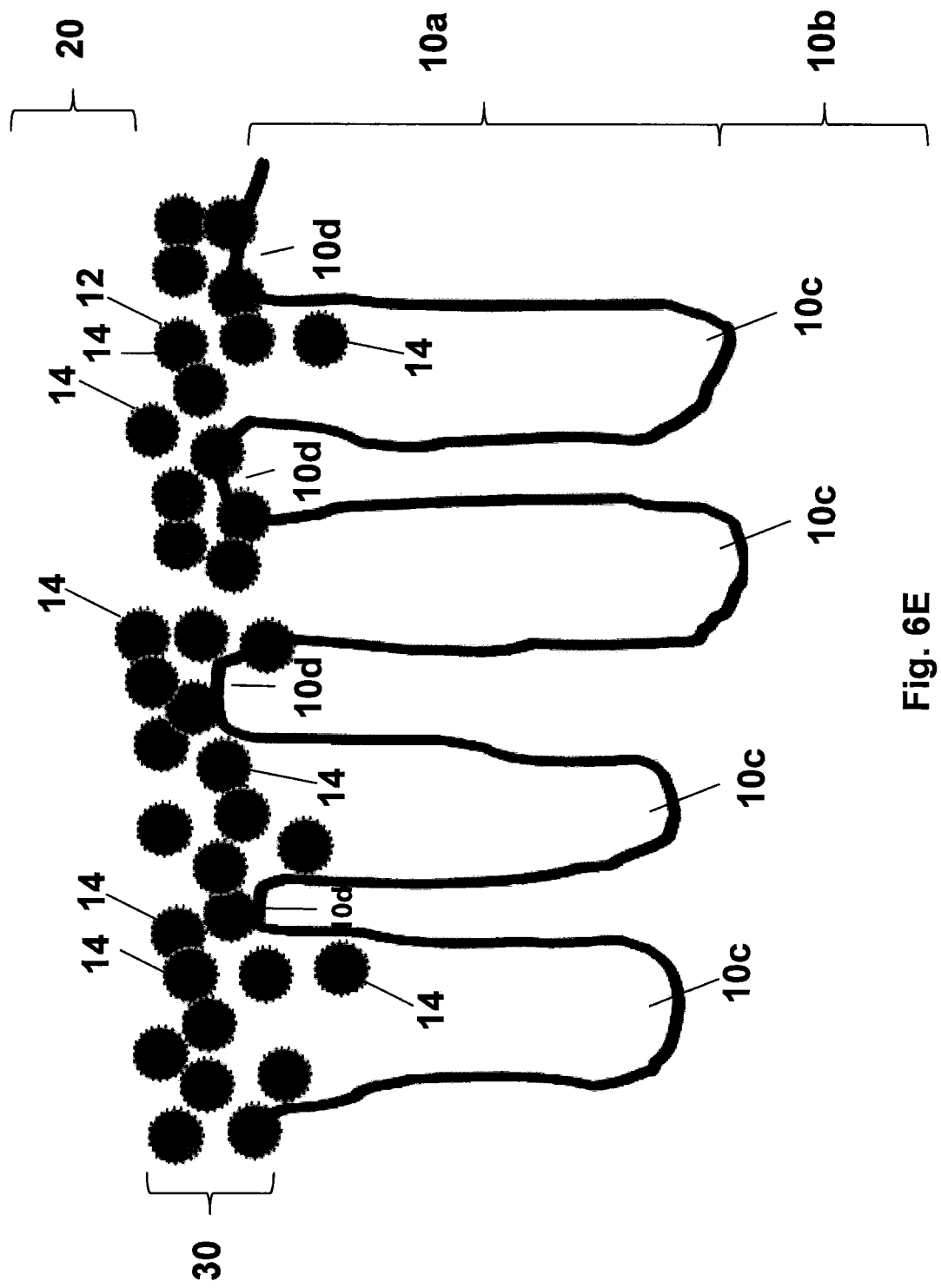

FIGS. 6A and 6E illustrate two different mechanisms for achieving surface layers of ionic nanoparticles on a porous polymer substrate based on the relative charge density on the ionic nanoparticles consistent with the disclosed embodiments. FIGS. 6A and 6E illustrate pores 10c in surface area 10a. In certain instances, coverage of surface 10a by ionic particles 14 may be tuned by tuning the net surface charge 12 of the ionic particles 14. It should be noted that the pores 10c shown in FIG. 6A, as well as any other pores discussed herein, are not necessarily bounded at the surface area 10a, as shown in FIG. 6A. For example, pores 10c, and any other pores discussed herein, may be open, as shown in FIG. 6B. Such open pores 10c, as shown in FIG. 6B, may, for example, include a network of pores in the surface area 10a or bulk 10b of the substrate 10. In fact, many pores 10c in a substrate 10 used as a separator for battery applications will penetrate beyond surface area 10a and/or form networks of pores 10c within the bulk 10b of the substrate 10.

In FIG. 6A, ionic particles 14 have relatively high net surface charge 12. FIG. 6D illustrates a transmission electron microscopy micrograph of a separator material corresponding to the process in FIG. 6A. FIG. 6D corresponds to the case of a relatively high net surface charge 12, a relatively thin surface layer 30 of ionic particles 14 and relatively good coverage by ionic particles 14 of the pores 10c. The high net surface charge 12 may occur, for example, when particles 14 in the deposition solution 20 have a ζ with a relatively high magnitude. The ζ with a relatively high magnitude may be either positive or negative, as may the high net surface charge 12 of the ionic particles 14. The relatively high net surface charge 12 may cause a substantial net repulsive force F1 between ionic particles 14, as shown in FIG. 6A. In some cases, the substantial net repulsive force F1 may be of sufficient magnitude to drive ionic particles 14 into pores 10c of the surface area 10a, as shown in FIGS. 6A, 6C and 6D. As shown in FIGS. 6A and 6D, coverage of the surface 10a by the ionic particles 14 may be substantially uniform in the pores 10c and in the outer edges 10d of the surface 10a.

However, coverage of the surface area 10a in FIGS. 6A and 6D is merely exemplary. In fact, the net surface charge 12 of the ionic particles 14 may be tuned for a number of different possible ways of covering the surface area 10a. For example, the net surface charge 12 of the ionic particles 14 may be tuned so that the outer edges 10d of the surface area 10a retain several layers of ionic particles 14, while the pores 10c retain a single layer of ionic particles 14 or less than a single layer of ionic particles 14. The latter roughly corresponds to the coverage shown in FIG. 6C. FIG. 6C corresponds to the case of a relatively moderate net surface charge 12, a relatively thick surface layer 30 of ionic particles 14 and relatively good coverage by ionic particles 14 of the pores 10c. Alternatively, the net surface charge 12 of the ionic particles 14 may be tuned such that the outer edges 10d of the surface area 10a retain a single layer or less than a single layer of ionic particles 14, while the pores 10c retain a single layer or more than a single layer of ionic particles 14. In still other variations, ionic particles 14 with different net surface charges 12 may be used simultaneously to cover portions of the outer edges 10d of the surface area 10a, portions of the pores 10c or both.

Figure 6F:
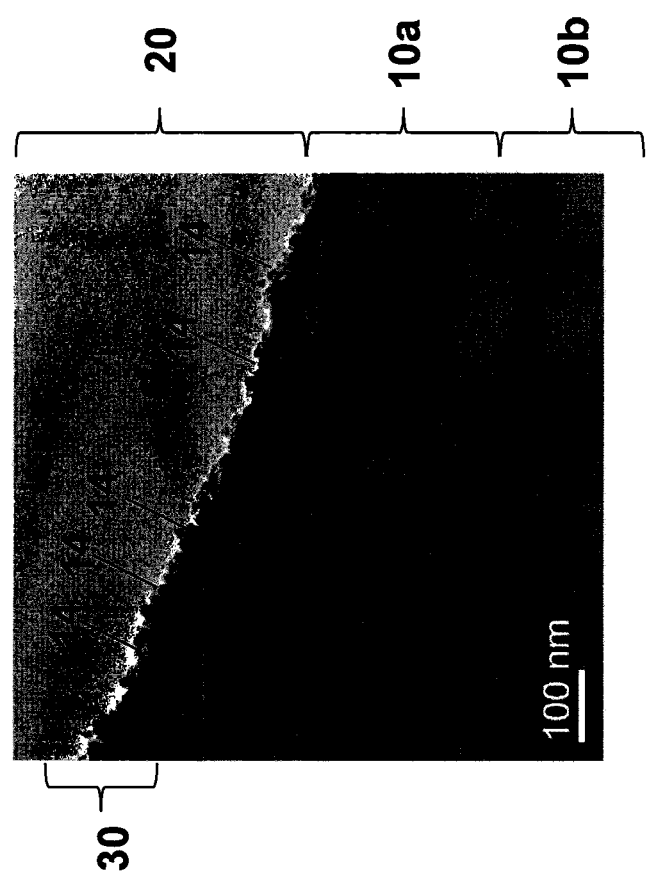
FIG. 6F shows a transmission electron microscopy micrograph of a separator material corresponding to the process in FIG. 6E.

In FIG. 6E, ionic particles 14 have relatively low net surface charge 12. FIG. 6F shows a transmission electron microscopy micrograph of a separator material corresponding to the process in FIG. 6E. FIG. 6F corresponds to the case of a relatively low net surface charge 12, a relatively thick surface layer 30 of ionic particles 14 and relatively sparse coverage or virtually no coverage by ionic particles 14 of the pores 10c. The low net surface charge 12 may occur, for example, when particles 14 in the deposition solution 20 have a ζ with a relatively low magnitude. The ζ with a relatively low magnitude may be either positive or negative, as may the low net surface charge 12 of the ionic particles 14.

The relatively low net surface charge 12 may, for example, render repulsive forces between the ionic particles 14 weaker than attractive forces between the particles due to, for example, polarization effects. If this occurs, it may create a substantially attractive net force F2 between ionic particles 14, as shown in FIG. 6E. In some cases, the substantially attractive net force F2 may be sufficient to prevent ionic particles 14 from entering into pores 10c of the surface area 10a, as shown in FIG. 6E. Moreover, in some cases, the substantially attractive net force F2 may create a surface layer 30 of ionic particles 14 that substantially covers the pores 10c. However, coverage of the surface area 10a in FIG. 6E is merely exemplary. In fact, the net surface charge 12 of the ionic particles 14 may be tuned for a number of different possible ways of covering the surface area 10a. For example, the net surface charge 12 of the ionic particles 14 may be tuned so that the outer edges 10d of the surface area 10a retain several layers of ionic particles 14, while the pores 10c are either covered or uncovered by the surface layer 30 of ionic particles 14. In still other variations, ionic particles 14 with different net surface charges 12 may be used simultaneously to cover portions of the outer edges 10d of the surface area 10a, portions of the pores 10c or both.

Figure 7A:
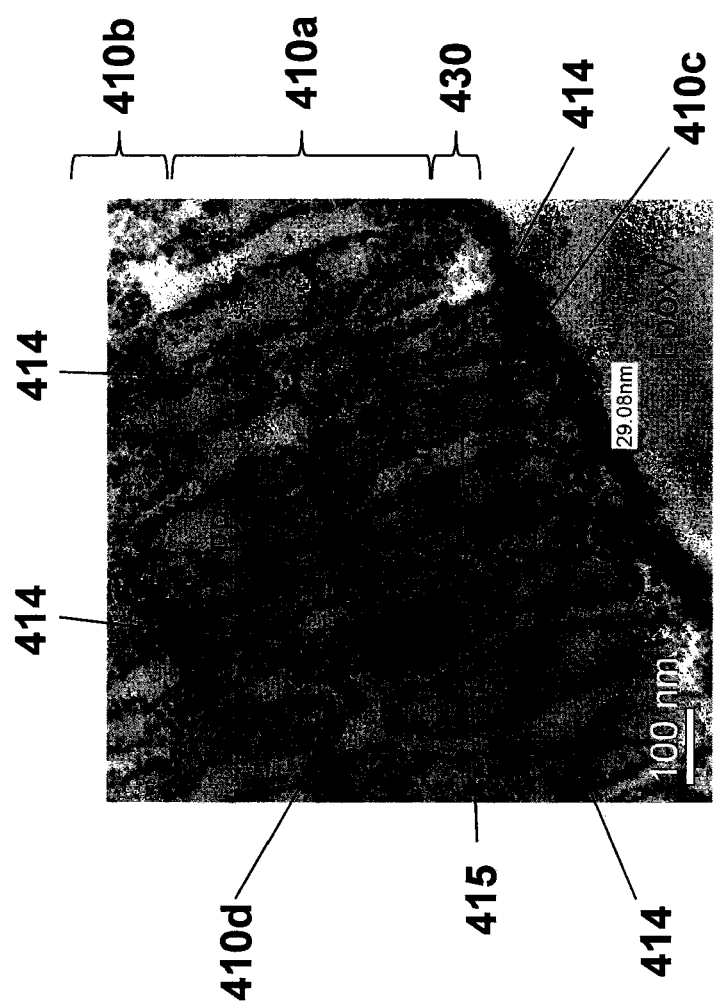
FIGS. 7A-7B show transmission electron microscopy micrographs of two other hybrid separators including porous polypropylene (PP), consistent with the disclosed embodiments.
Figure 7B:
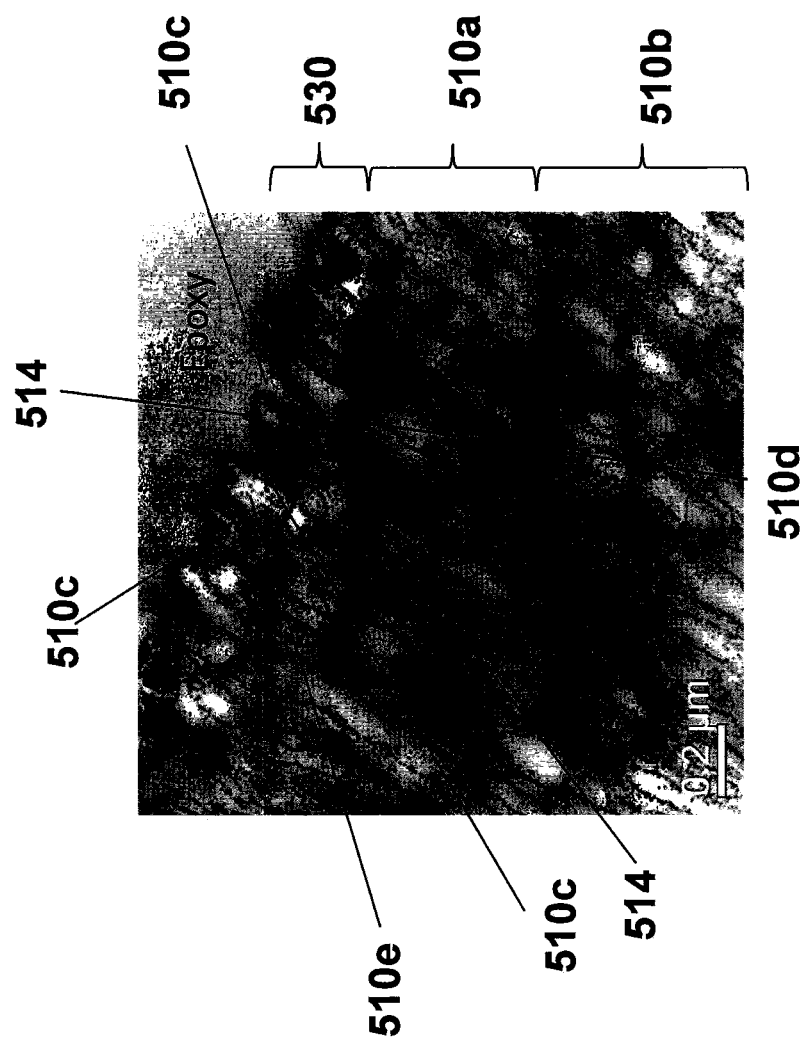

FIGS. 7A-7B show transmission electron microscopy micrographs of two other hybrid separators consistent with the disclosed embodiments including porous polypropylene (PP). In particular, FIGS. 7A and 7B show how different deposition parameters may create a different covering of exemplary substrates that are essentially the same.

As shown in FIG. 7A, a substrate 410 of the separator 400 includes pores 410c, as well as other features. Ionic particles 414 are present both in the pores 410c and as an ionic particle layer 630 on a surface area 610a of the substrate 10. The ionic particle layer 430 appears to have a thickness of several ionic nanoparticles 414. The ionic particles 414 present in the pores 410c appear to have coated the layers of the pore walls 410d with at least a monolayer of ionic particles 414. In fact, certain regions 415 of the pores 410c appear to have ionic particle layers 414 with a thickness considerably greater than a monolayer. Moreover, it appears from FIG. 7A that many of the pores 410c are covered by the ionic particle layer 430 at the surface area 410a of the substrate 410.

As shown in FIG. 7B, a substrate 510 of the separator 500 includes pores 510c, as well as other features. FIG. 7C is a schematic illustration of the covering of a pore walls 510d by ionic particles 514, as also shown in FIG. 7B. 510e are areas of polymer, polypropylene. Ionic particles 514 are present both in the pores 510c and as an ionic particle layer 530 on a surface area 510a of the substrate 10, as shown in FIGS. 7B and 7C. The ionic particle layer 530 is similar in thickness to the ionic particle layer 430. The ionic particles 514 present in the pores 510c appear to have coated the layers of the pore walls 510d with approximately a monolayer of ionic particles 514 in a way that nearly fully covers the surfaces of the pore walls 510d.

Comparative Example 1

Figure 8:
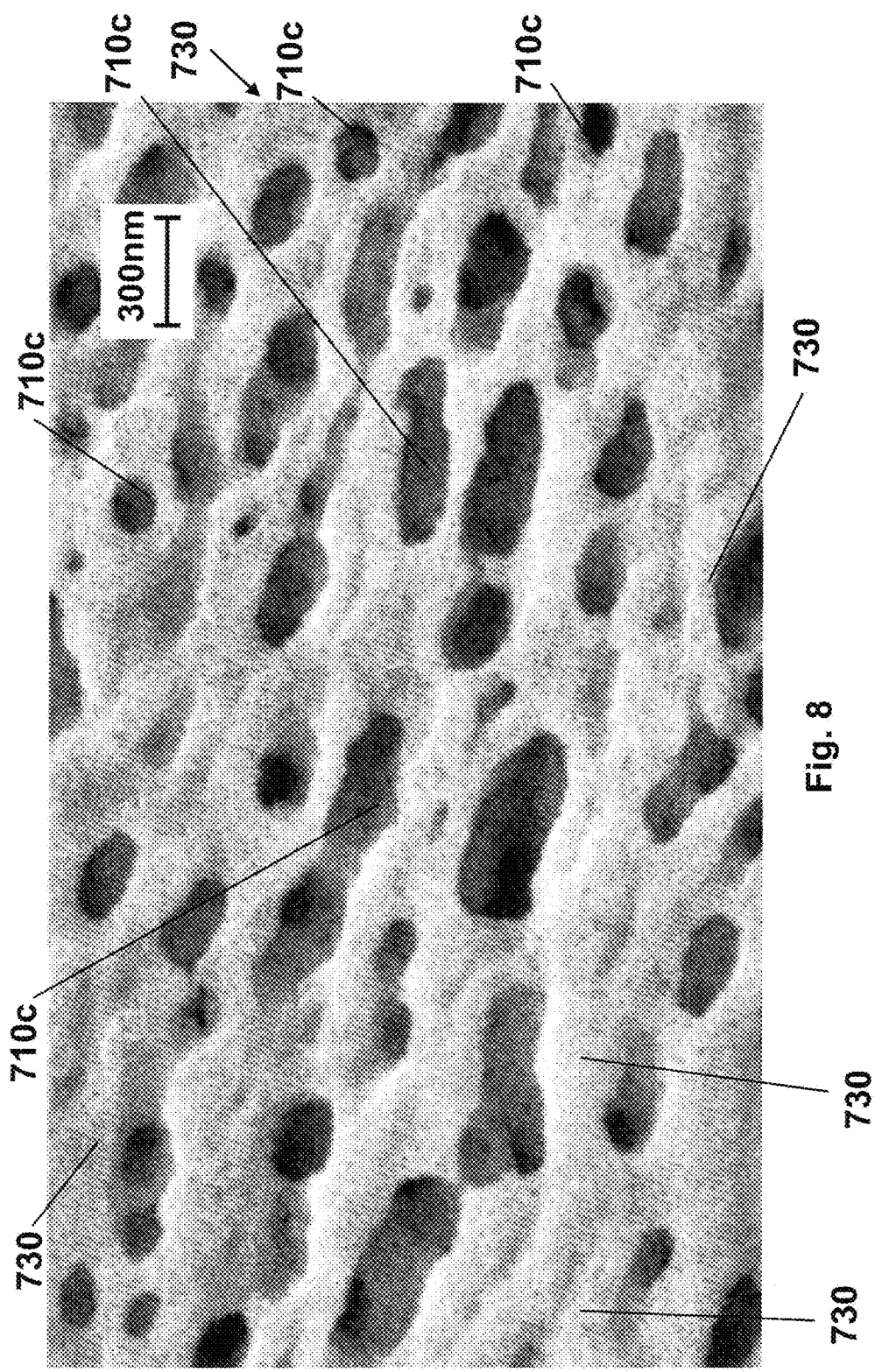
FIG. 8 shows an electron micrograph top view of a separator made according to aspects of the instant disclosure, by depositing an ionic nanoparticles on a surface of similar commercial separator substrate as the commercial separator in FIG. 8.

FIG. 8 shows an electron micrograph top view of a separator 700 made according to aspects of the instant disclosure, by depositing ionic nanoparticle coating 730 deposited on a surface of similar commercial separator substrate 710 as the commercial separator 510 in FIG. 1C. FIG. 8 shows that pores 710c in the substrate 710 remain exposed even after being coated by the ionic nanoparticle coating 730.

The size scale of FIGS. 8A and 1C is similar. A comparison of FIGS. 8A and 1C shows that the ionic nanoparticles coating 730 is considerably more uniform than particles 614 the ceramic/nonwoven separator 600. This is expected because, among other reasons, the ionic nanoparticles 714 are smaller by several orders of magnitude, thus, in some cases, enhancing the ability to form a uniform coating layer. Moreover, the ionic nanoparticles coating 730 preserves at least some of the underlying pores 710c of the substrate 710. In contrast, binder 616 and particles 614 appear to completely cover any pores in the underlying substrate 610.

TABLE 1

Exemplary comparison of characteristics and properties of a ceramic/nonwoven separator, such as that shown in FIG. 1C, with the separator 500 (FIG. 7B).

| Characteristic/ Property | Ceramic/ Nonwoven Separator | Ionic Nanoparticle Hybrid Separator (FIG. 8) |
|---|---|---|
| Filler Loading | Metal oxide 40-60 wt. % | Ionic NPs ~1 wt. % |

TABLE 1-continued

Exemplary comparison of characteristics and properties of a ceramic/nonwoven separator, such as that shown in FIG. 1C, with the separator 500 (FIG. 7B).

| Characteristic/ Property | Ceramic/ Nonwoven Separator | Ionic Nanoparticle Hybrid Separator (FIG. 8) |
|---|---|---|
| Bonding | Covalent | Ionic |
| Binder | Require(up to 15 wt. %) | Not required |
| Thickness of coating | Micro | Nano |
| Sintering | 50~350° C. multi-steps | No need |

Table 1 compares characteristics and properties of an exemplary ceramic/nonwoven separator, of the kind shown in FIG. 1C, with the separator 700, according to aspects of the instant disclosure, shown in FIG. 8. As shown in Table 1, loading of the underlying substrate 710 is 40-60 times lower for a typical ceramic/nonwoven separator. For this and other reasons, the separator 700 is able to improve electrochemical performance, wettability, chemical, thermal and mechanical stability and/or strength to the substrate 710 while being relatively light weight. The ionic particle layer 830 of the separator requires no binder, while a typical ceramic/nonwoven separator requires a binder that accounts for around 15 wt. % of the entire separator. Moreover, since the binding mechanism in for the separator 700 is ionic, adherence of the ionic particle layer 730 to the substrate 710 is expected to be substantially stronger than adherence of a ceramic layer to a substrate in a typical ceramic/nonwoven separator. In addition, although it is possible to create multi-layer coatings of ionic particle layer 730 of any desired thickness, ionic particle layer 730 may be as thin as a few nanometers. Typical ceramic layers in ceramic/nonwoven separators, for example, have minimum thicknesses on order of the size of the ceramic particles, e.g., microns.

Comparative Example 2

Figure 9:
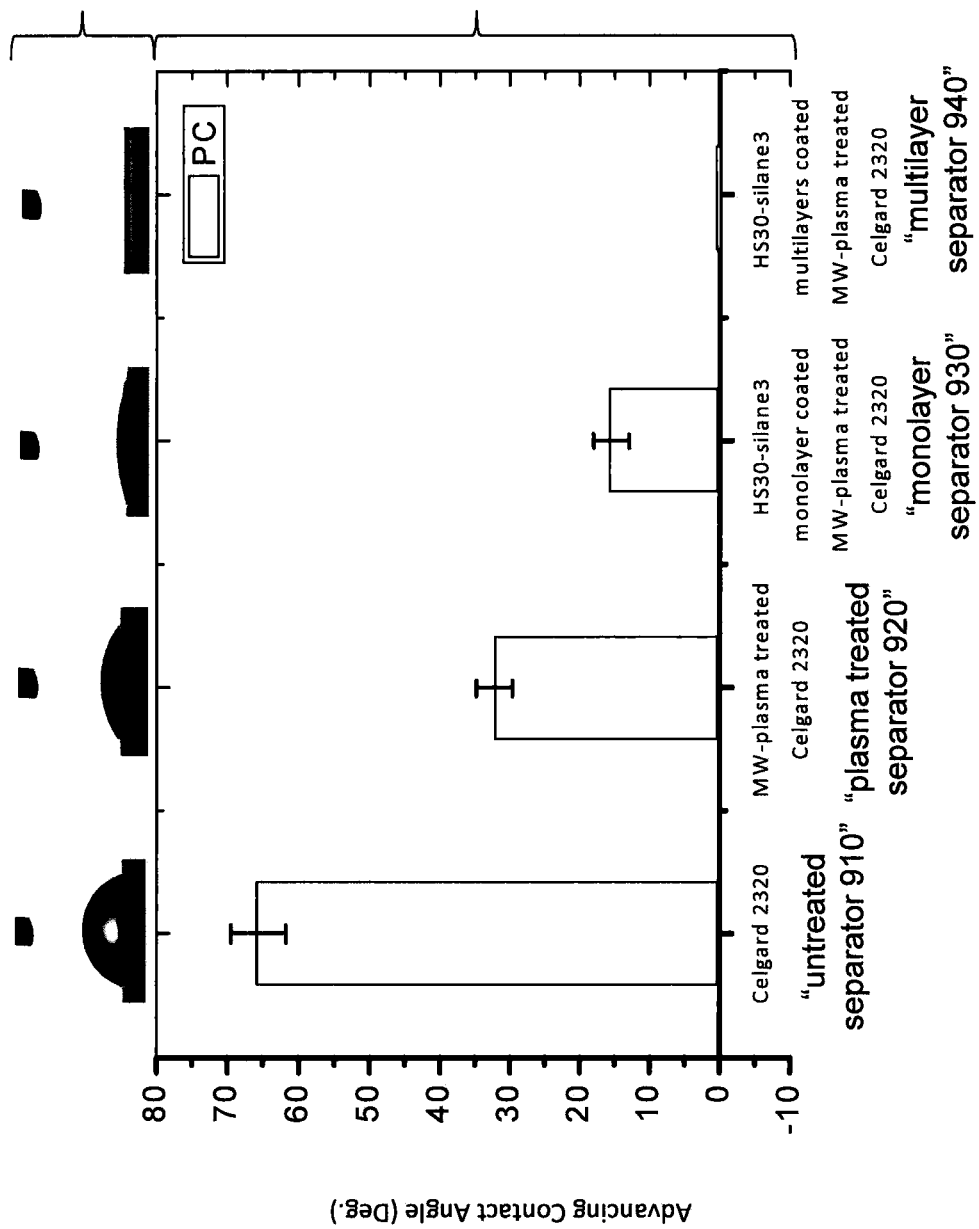
FIG. 9, including
Figure 10:
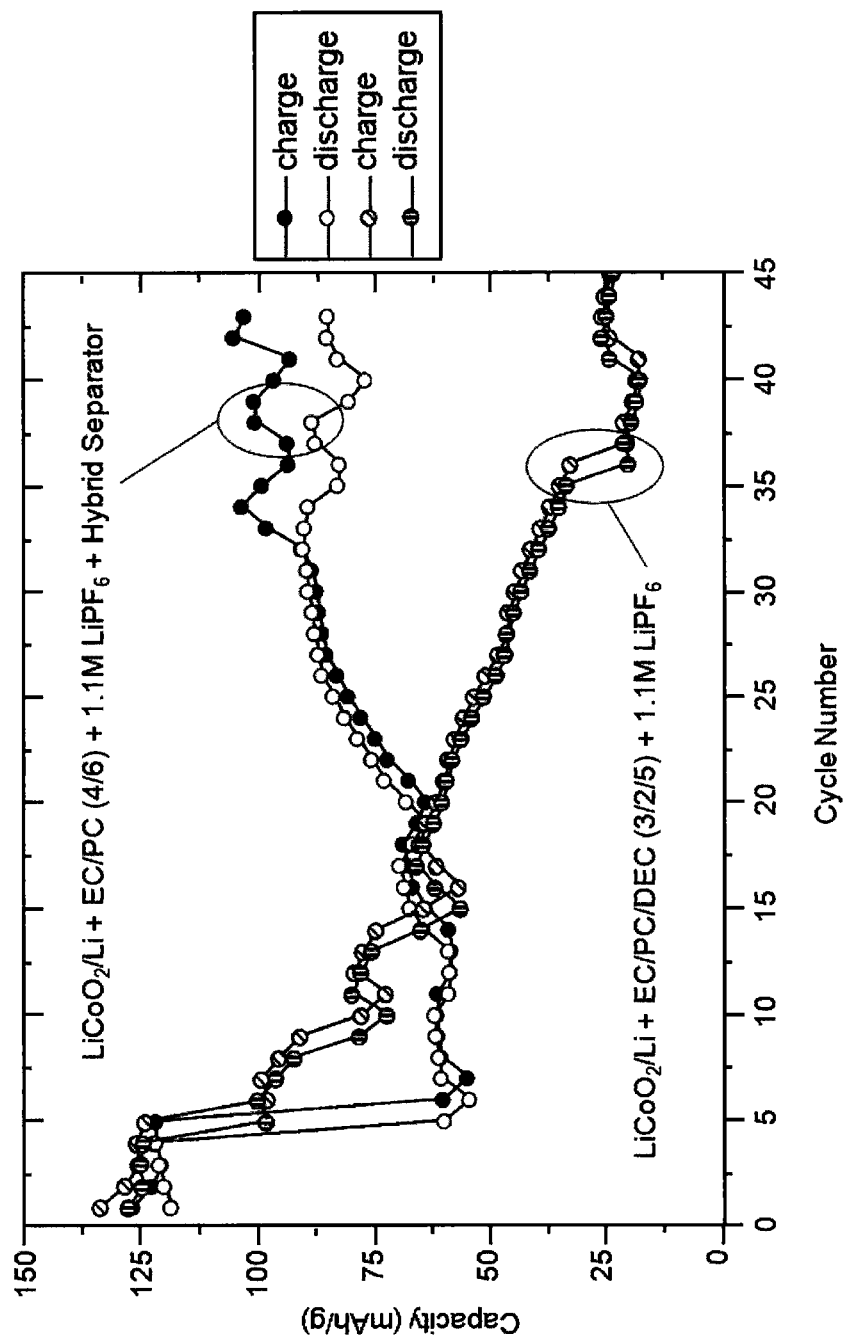
FIG. 10 presents data showing the charge/discharge characteristics of a polymer separator before and after coating with ionic nanoparticles consistent with the disclosed embodiments.

FIG. 9 illustrates an effect of ionic nanoparticles on wettability of a polymeric substrate by the commercial electrolyte propylene carbonate (PC). FIG. 9A illustrates the measured Advancing Contact Angle of PC (hereinafter "contact angle") for four different surfaces, a commercial polymer separator surface (Celgard 2320, hereinafter "untreated separator 900"), the separator surface after it has been plasma treated (MW-plasma treated Celgard 2320, hereinafter "plasma treated separator 910"), the plasma treated commercial polymer separator after having been coated with a monolayer of ionic nanoparticles (HS30-silane3 monolayer coated MW-plasma treated Celgard 2320, hereinafter "monolayer separator 920") and the plasma treated commercial polymer separator after having been coated with a multilayers of ionic nanoparticles (HS30-silane3 multilayers coated MW-plasma treated Celgard 2320, hereinafter "multilayer hybrid separator 930"). FIG. 9B illustrates a schematic representing the contact angle associated with each of the four different surfaces in FIG. 9A.

Contact angle is a measure of the wettability of a surface by PC. It is generally advantageous for battery separators to have an outer surface layer that increases or even maximizes wettability with respect to an electrolyte. This is especially true of separators used in batteries with particularly corrosive environments, such as Lithium Ion batteries. However, for certain applications, it may be advantageous for the wettability to be less extreme. In many situations, the ability to tune the wettability of the separator is advantageous.

As shown in FIG. 9A, the greatest decrease in contact angle, from around 65 degrees to 30, takes place by simply treating the Celgard 2320 with plasma. The increase of PC wettability by plasma treatment is likely related to the net surface charge (and polarity) imparted to the surface during the technique. Wettability of the separator by PC further increases as layers of ionic particles are added. As shown in FIG. 9A, the contact angle decreases monotonically as one adds layers of ionic nanoparticles (e.g., from zero layers of ionic nanoparticles on separators 910 and 920, to one layer in separator 930 and multi-layers in separator 940).

As shown in FIG. 9A, multilayer hybrid separator 930 has a contact angle of substantially zero. This is an indication, as reflected in the schematic in FIG. 9B, that PC completely wets a surface of separator 930. On the other hand, the contact angle for separator 920 is around 10 degrees±2 degrees. While this higher contact angle may indicate less wettability, contrasting it with the contact angle measured for separator 930 illustrates that: 1) in this regime, wettability seems to increase as the layers of ionic particles are increased and 2) this particular example has demonstrated that wettability is tunable for HS30-silane3 multilayers coated MW-plasma treated Celgard 2320 by controlling the number of deposited layers of ionic particles.

Comparative Example 3

FIG. 1A0 presents data showing the charge/discharge characteristics of a polymer separator before and after coating with ionic nanoparticles consistent with the disclosed embodiments. As shown FIG. 1A0, the specific capacity of the system including an ionic nanoparticle "hybrid" separator, as well as that for the system including the DEC electrolyte roughly decrease with cycling. However, FIG. 1A0 shows that the specific capacity of the hybrid separator is substantially higher after 40 or more cycles than the system including the DEC electrolyte. This may be an indication that the cycleability of the hybrid separator is substantially improved over other, commercial alternatives.

As illustrated, the materials or techniques as illustrated may increase electrochemical performance, chemical, thermal or mechanical strength of a device, such as a battery separator, without a substantial increase in weight. Thus, devices can be made more robust without sacrificing other important properties related to their function.

While some embodiments were discussed in the context of battery separators and other battery applications, they are illustrative and do not limit the applications of the disclosed substrate to battery applications. For example, the materials or techniques may be used in light-weight applications or other coating technologies used to improve mechanical, chemical or thermal durability of a product.

The specific order or hierarchy of steps in the processes disclosed is an illustration of exemplary approaches. Based upon design preferences, manufacturing equipment, and other considerations, the order or hierarchy of the steps may be rearranged. The accompanying method claim, therefore, does not limit the specific order or hierarchy to the order of the elements presented.

It will be apparent to those skilled in the art that various modifications and variations can be made to the disclosed methods and materials. It is intended that the specification and examples be considered as exemplary only, with a true scope of the disclosure being indicated by the following claims and their equivalents.

We claim:

1. A separator substrate, comprising:
   a substrate having a bulk portion and a surface portion, the surface portion having at least a first porous area with a net negative charge and at least a second porous area with a net positive charge;
   ionic particles coupling to at least a part of each one of the first porous area and the second porous area, the ionic particles including first ionic particles having a net positive charge and coupling to the first porous area, and second ionic particles having a net negative charge and coupling to the second porous area; and
   a graft agent coupled with the ionic particles, the graft agent comprising at least one of primary amine-containing silane, secondary amine-containing silane, tertiary amine-containing silane, quaternary amine-containing silane, carboxylic containing silane, sulfonate containing silane, or phosphate-containing silane,
   wherein the coupling between the part of the at least one porous area and the ionic particles results in at least one of electrochemical performance, chemical stability, thermal stability, wettability, and mechanical strength of the separator substrate, and
   at least a portion of the ionic particles are coupled to interior walls of pores of the porous area.

2. The separator substrate according to claim 1, wherein the ionic particles form at least one ionic-particle layer that has a higher chemical stability when exposed to at least one of lithium, electrolytes and additives to electrolytes than a chemical stability of the substrate and separator substrate a greater mechanical strength than a mechanical strength of the substrate.

3. The separator substrate according to claim 2, wherein a thickness of the ionic-particle layer is between about 1 nm and 10 microns.

4. The separator substrate according to claim 2, wherein a wettability of the ionic-particle layer with respect to a liquid comprising electrolyte is greater than a wettability of the substrate with respect to the liquid.

5. The separator substrate according to claim 4, wherein the separator substrate is a separator in an electrochemical cell.

6. The separator substrate according to claim 1, wherein the ionic particles comprise nanoparticles having a size in the range of about 1 nm to 500 nm.

7. The separator substrate according to claim 1, wherein the substrate comprises a polymer.

8. The separator substrate according to claim 1, wherein the ionic particles comprise a metal oxide being at least one of $SiO_2$, $ZnO$, $SnO_2$, $TiO_2$, $ZrO_2$, $Al_2O_3$, $BaTiO_3$, $Y_2O_3$, $MgO$, $NiO$, $CaO$, $Ti_2O_5$.

9. The separator substrate according to claim 1, wherein at least some of the ionic particles carry a zeta-potential in the range of about −70 mV to 70 mV.

10. The separator substrate according to claim 1, wherein the substrate comprises at least one polyelectrolyte.

11. The separator substrate according to claim 10, wherein the at least one polyelectrolyte comprises at least one of N, S, B, P, C, Si, and O.

* * * * *